United States Patent [19]
Tanabe et al.

[11] Patent Number: 5,884,171
[45] Date of Patent: *Mar. 16, 1999

[54] RADIO COMMUNICATION APPARATUS AND METHOD FOR PREVENTING HIDDEN TERMINALS FROM INTERRUPTING COMMUNICATIONS

[75] Inventors: Takumi Tanabe, Kobe; Hitoshi Takai, Toyono-gun; Hiroaki Asano, Katano, all of Japan

[73] Assignee: Matsushita Electric Industrial Co., Ltd., Osaka, Japan

[*] Notice: The term of this patent shall not extend beyond the expiration date of Pat. No. 5,754,947.

[21] Appl. No.: 852,185

[22] Filed: May 6, 1997

Related U.S. Application Data

[62] Division of Ser. No. 404,047, Mar. 14, 1995, Pat. No. 5,754,947.

[30] Foreign Application Priority Data

Mar. 15, 1994 [JP] Japan ............................ 6-044250
May 31, 1994 [JP] Japan ............................ 6-118194

[51] Int. Cl.⁶ .................................................. H04Q 7/20
[52] U.S. Cl. ........................ 455/434; 455/515; 455/63
[58] Field of Search ........................ 455/67.1, 63, 69, 455/9, 68, 422, 434, 501, 517, 524, 575, 515; 370/524

[56] References Cited

U.S. PATENT DOCUMENTS

| | | |
|---|---|---|
| 4,409,687 | 10/1983 | Berti et al. . |
| 4,656,627 | 4/1987 | Hasley et al. . |
| 4,658,435 | 4/1987 | Childress et al. . |
| 5,276,911 | 1/1994 | Levine et al. . |
| 5,307,509 | 4/1994 | Michalon et al. . |
| 5,488,611 | 1/1996 | Zijderhand et al. . |
| 5,754,947 | 5/1998 | Tanabe et al. ............................ 455/63 |

FOREIGN PATENT DOCUMENTS

| | | |
|---|---|---|
| 507626 | 10/1992 | European Pat. Off. . |
| 520051 | 10/1993 | European Pat. Off. . |

OTHER PUBLICATIONS

"A Distributed Access Proposal Supporting Time Bounded Services," by W. Diepstraten, IEEE Working Group Paper 802.211–93/70, May 1993.

"A Hybrid Wireless MAC Protocol," by K. Biba, IEEE Working Group 802.11/91, Sep. 1991.

"Packet Switching in Radio Channels; Parat II—The HiddenTterminal Problem in Carrier Sense Multiple Access and the Busy–Tone Solution", IEEE Transaction on Communications, vol. COM–23, No. 12, Dec. 1975.

"Voice Traffic Capacity of Base Control Access with Collision Detection (BCMA/CD) for Digital Cellular Radio", by Y. Kriaras et al., IEEE Int'l Telecom. Symposium, 3 Sep. 1990.

"Code Assignment for Hidden Terminal Interference Avoidance in Multihop Packet Radio Networks", by A. Bertossi et al., IEEE Infocom 1992, the Conference on Computer Communications.

*Primary Examiner*—Nguyen Vo
*Attorney, Agent, or Firm*—Price Gess & Ubell

[57] ABSTRACT

A radio communication method for transmitting and receiving data between a first terminal and a second terminal comprises the following two steps. A step of establishing a connection between the first terminal and the second terminal when the first terminal and the second terminal have detected that a signal has not been transmitted on a predetermined channel, and the other step of starting data communications between the first terminal and the second terminal which have established the connection, and transmitting the predetermined signal on the predetermined channel from both the first terminal and the second terminal throughout the data communications.

4 Claims, 18 Drawing Sheets

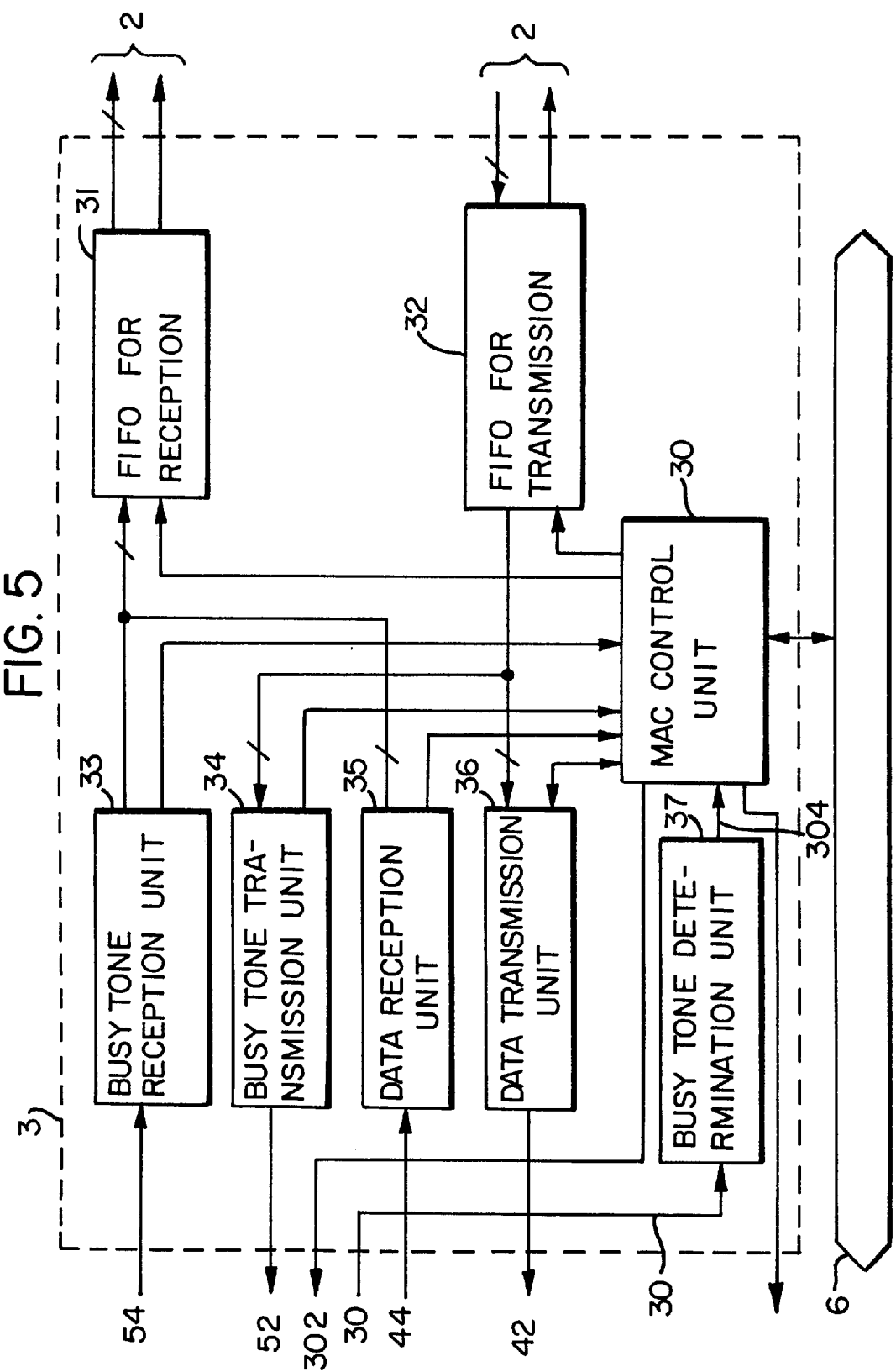

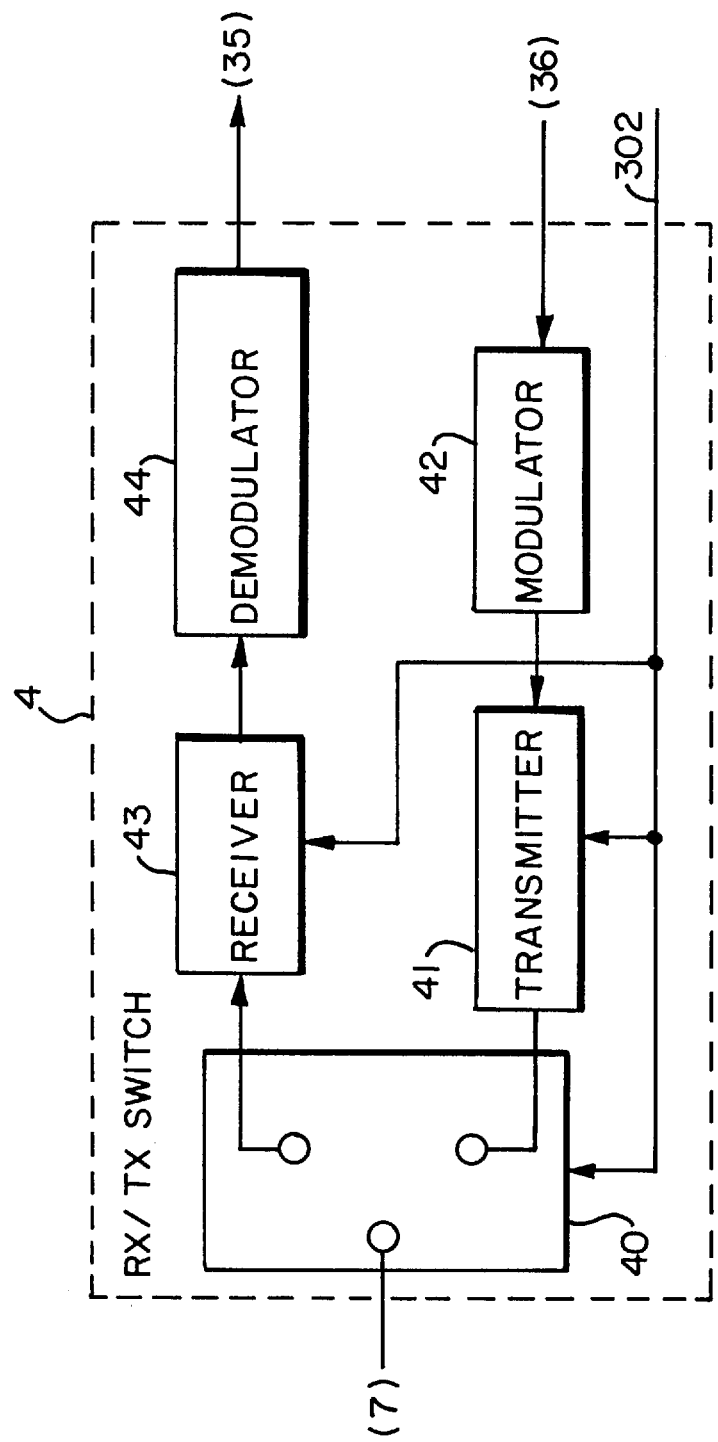

FIG. 11

|    | A1  | A2  | A3  | B1  | B2  | B3  | C1  | C2  | C3  |
|----|-----|-----|-----|-----|-----|-----|-----|-----|-----|
| A1 | 0   | 105 | 105 | 97  | 111 | 108 | 112 | 109 | 116 |
| A2 | 105 | 0   | 102 | 100 | 97  | 97  | 105 | 87  | 108 |
| A3 | 105 | 102 | 0   | 91  | 102 | 91  | 97  | 103 | 107 |
| B1 | 97  | 100 | 91  | 0   | 105 | 97  | 105 | 103 | 110 |
| B2 | 111 | 97  | 102 | 105 | 0   | 95  | 97  | 87  | 97  |
| B3 | 108 | 97  | 91  | 97  | 95  | 0   | 91  | 97  | 102 |
| C1 | 112 | 105 | 97  | 105 | 97  | 91  | 0   | 103 | 97  |
| C2 | 109 | 87  | 103 | 103 | 87  | 97  | 103 | 0   | 103 |
| C3 | 116 | 108 | 107 | 110 | 97  | 102 | 97  | 103 | 0   |

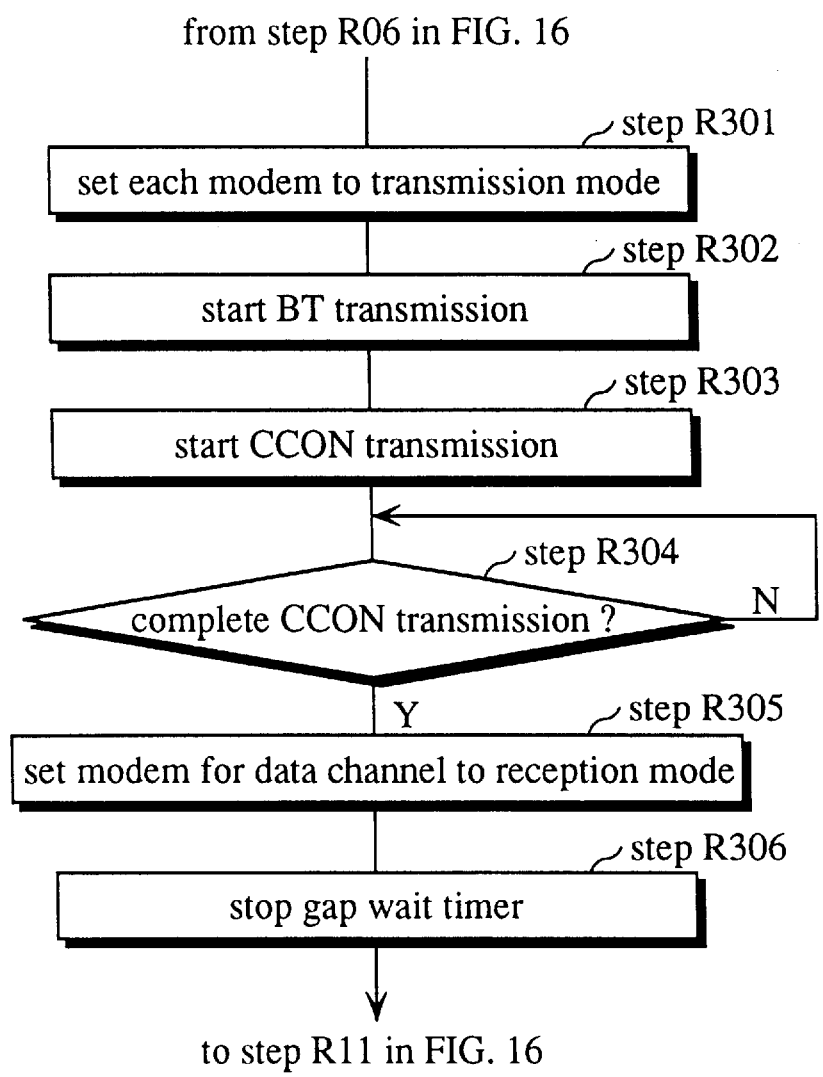

RADIO COMMUNICATION APPARATUS AND METHOD FOR PREVENTING HIDDEN TERMINALS FROM INTERRUPTING COMMUNICATIONS

This is a division of U.S. Ser. No. 08/404,047, filed on Mar. 14, 1995, for a RADIO COMMUNICATION APPARATUS AND METHOD FOR PREVENTING HIDDEN TERMINALS FROM INTERRUPTING COMMUNICATIONS, U.S. Pat. No. 5,754,947.

BACKGROUND OF THE INVENTION (1) Field of the Invention

The present invention relates to an apparatus and method for radio communication in a radio network, and particularly to such an apparatus and method applicable to a distributed environment, i.e. a network which has a distributed topology.

(2) Description of the Related Art

Radio networks with the use of radio wave or infrared light have been in great demand these days because they require no communication cables. Radio terminals can intercommunicate from any site within their communication ranges, and be used on the move when they are reduced to portable.

However, radio networks often suffer from so called "Hidden Terminal Problem" which does not affect wired networks and is caused by a radio terminal outside their communication ranges.

FIG. 1 is an illustration to be used to explain a Hidden Terminal Problem (hereinafter HTP).

A, B, and C are radio terminals, and the circles represent respective communication ranges. When terminal A is communicating with terminal B, terminal C is getting no signal from terminal A. Consequently, terminal C might start to communicate with terminal B, without knowing the communications between terminals A and B. If terminal B is thus communicated from both terminals A and C, the communication carried out so far between terminals A and B ends up in vain. Thus, the occurrence of HTP requires retransmission, reducing data transmission throughput in radio networks.

In order to solve the HTP, various radio network communication schemes have been proposed as follows.

<CSMA/CA+Ack>

A communication scheme called CSMA/CA+Ack (Carrier Sense Multiple Access with Collision Avoidance plus Acknowledgement) has been proposed by W. Diepstraten in "A Distributed Access Protocol Proposal Supporting Time Bounded Service" (IEEE Working Group Paper 802.11-93/70).

Although this scheme is not directly concerned with the solution of HTP, it is a basic communication scheme in networks and referred to later in the explanation of communication schemes.

Generally, multiple accesses in a network can be realized based on a MAC (Medium Access Control) layer protocol. The CSMA/CA+Ack is a MAC layer protocol based on CSMA/CA which is widely used as a MAC layer protocol in a radio network. The CSMA/CA+Ack has a function for acknowledgement and retransmission of frames at a MAC layer level, in addition to the functions of CSMA/CA. The CSMA/CA is more suitable to radio communications than CSMA/CD (CSMA with Collision Detection) which is widely used as the MAC layer protocol in cable networks.

According to the CSMA/CA+Ack, a first terminal which is ready to transmit data makes sure that the transmission path has no signal for a predetermined gap time period, and then starts the data transmission in frames to a second terminal. The second terminal, which has received the frames returns a confirming frame to the first terminal in order to report the successful reception of the frames, after having made sure that the transmission path has no signal for a predetermined gap time period.

Although the use of the confirming frames has improved the reliability of the data transmission, this scheme presupposes that a signal transmitted by any of terminals is distributed to all the terminals in the network, which does not insist on solving the HTP.

<K. Biba>

K. Biba has proposed a scheme of solving HTP in "A hybrid Wireless MAC Protocol Supporting Asynchronous and Synchronous MSDU Delivery Service" (IEEE Working Group Paper 802.11-91/92). In order to avoid HTP, a transmitting terminal and a receiving terminal establishes a connection every time a frame is transmitted, and informs the other terminals of a time period during which the transmission path is occupied in establishing a connection.

According to this scheme, a transmitting terminal sends an RTS (request to send) frame prior to a data transmission, and a receiving terminal returns a CTS (Clear to Send) frame to report the reception of the RTS frame. Then, the transmitting terminal sends data in frames, and the receiving terminal returns an ACK frame to report the receipt of the frames. An RTS frame carries the length of data to be transmitted, and a CTS frame carries the length of data to be received. Prior to the transmission of RTS frames and CTS frames, the condition of the transmission path is checked with CSMA. The terminals other than the destination of an RTS frame check the length of the data carried in the frame and refrain from accessing the transmission path until the transmission and acknowledgement of the data is completed. In the same manner, the terminals other than the destination of a CTS frame do not access the transmission path until the transmission and acknowledgement of the data is completed. This is how HTP is solved in this system.

However, a connection must be established per frame, so that the efficiency of data transmission is decreased when large data being divided into a plurality of frames are transmitted.

For another problem, the transmission of an RTS (or CTS) frame may be sometimes unsuccessful because of a collision. In that case, a terminal which successfully received the RTS (or CTS) frame must be deprived of the access to the transmission path in vain for the time period corresponding to the unexecuted data transmission.

For further another problem, there is a possibility that a terminal which moved into the transmission range of the receiving terminal starts another data transmission without knowing the preceding data transmission. Thus, HTP resulting from a terminal's movement cannot be solved.

<Japanese Laid-open Patent Application No. 5-260051>

The scheme proposed in Japanese Laid-open Patent Application No. 5-260051 is used in a system composed of a plurality of terminals, and a base station which communicates with all the terminals. An available frequency band is divided into a message channel, an up link channel, and a down link channel.

A terminal which is ready to transmit data checks the presence or absence of a channel tone, and in the case of its absence, transmits a channel tone on the up link channel. Detecting the channel tone, the base station transmits the same channel tone on the down link channel. Detecting the return of the channel tone, the terminal starts data transmission.

This scheme requires the base station to solve HTP, so that in case that the base station is out of order, all the terminals in the network becomes unable to communicate, deteriorating the reliability of the entire network.

<U.S. Pat. No. 4,409,687>

The communication scheme disclosed in U.S. Pat. No. 4,409,687 can use a plurality of channels assigned to different frequencies, and is used in a system composed of a plurality of terminals and a base station. A terminal in the transmission mode scans all the channels prior to a data transmission, and if a channel in the idle state is found, the terminal transmits a busy tone on the channel and further transmits a predetermined group tone. Receiving the busy tone from the terminal, the base station transmits the busy tone on the channel, and further repeats the group tone. A terminal in the reception mode scans all the channels, and establishes a connection with the transmitter in response to the reception of the predetermined group tone.

This scheme can solve HTP; however, it still requires a base station (repeater), and as a result this system suffers from the same problems as the above mentioned Japanese Laid-open Patent Application No. 5-260051.

<U.S. Pat. Nos. 4,360,927 and 4,658,435>

U.S. Pat. Nos. 4,360,927 and 4,658,435 have also disclose communication schemes capable of solving the HTP and of using a plurality of channels; however, these schemes require a base station, suffering the same problems as mentioned above.

SUMMARY OF THE INVENTION

The object of the present invention is to provide an apparatus and method of radio communication capable of avoiding HTP in a radio network and applicable to a distributed environment having no base station, thereby realizing a high reliability and high transmission efficiency.

The object can be achieved by a radio communication method for transmitting and receiving data between a first terminal and a second terminal. The method comprises the following steps:

establishing a connection between the first terminal and the second terminal when the first terminal and the second terminal have detected that a signal has not been transmitted on a predetermined channel; and starting data communications between the first terminal and the second terminal which have established the connection, and transmitting a predetermined signal on the predetermined channel from both the first terminal and the second terminal throughout the data communications.

The connection establishment step may comprise the following sub steps:

detecting a presence or absence of the signal transmitted on the predetermined channel, by the first terminal;

transmitting a first control signal from the first terminal to the second terminal in a case where the absence of the signal transmitted on the predetermined channel has been detected by the first terminal;

detecting a presence or absence of the signal transmitted on the predetermined channel, by the second terminal, when the second terminal has received the first control signal;

transmitting a second control signal from the second terminal to the first terminal in a case where the absence of the signal transmitted on the predetermined channel has been detected by the second terminal; and receiving the second control signal by the first terminal.

Each of the first terminal and the second terminal may be assigned a control channel provided for connection establishment and a data channel provided for data transmission, and the predetermined channel may be the control channel.

According to the above construction, both a transmitting terminal and a receiving terminal transmit a busy tone on a control channel while they are in process of data communication. Another terminal which is ready to transmit data is supposed to check before data transmission that there is no busy tone transmitted, so that the terminal can start communication only when no terminal which is inside the checking terminal's communication range is in a communication process. As a result, HTP can be prevented.

Furthermore, the HTP is prevented by transmitting a busy tone, so that a highly reliable radio network can be constructed in a distributed environment which is dispensable with a base station.

Each of the first terminal and the second terminal may be assigned a data channel provided for connection establishment and data transmission and a control channel, and the predetermined channel may be the control channel.

According to the above-mentioned construction, the control channel is used only for the transmission of busy tones. Consequently, the band width for the control channel can be narrower, thereby making a good use of frequency band width.

The connection establishment step may further comprise the sub step of starting a transmission of the predetermined signal on the control channel from the second terminal, at a predetermined time point after a completion of the sub step of detecting the presence or absence of the signal transmitted on the control channel by the second terminal.

The connection establishment step may further comprise the sub step of transmitting the predetermined signal on the control channel from the first terminal concurrently with a transmission of the first control signal from the first terminal.

According to the above-mentioned construction, busy tones are transmitted on the control channel also in the connection establishment step. Consequently, data communication in a connection establishment step is less affected by another terminal, establishing a connection in a shorter time.

The object can be achieved by a radio communication apparatus for transmitting and receiving data to and from a desired radio communication apparatus.

The radio communication apparatus comprises the following units:

a connection establishment unit for detecting a presence or absence of a signal transmitted on a predetermined channel, and for establishing a connection with the desired radio communication apparatus when the absence of the signal transmitted on the predetermined channel has been detected;

a data communication unit for starting data communications with the desired radio communication apparatus, responding to the connection establishment; and a signal transmission unit for continuing a transmission of a predetermined signal on the predetermined channel from the radio communication apparatus and the desired radio communication apparatus throughout the data communications.

The connection establishment unit may comprise the following units:

a detection unit for detecting a presence or absence of the signal transmitted on the predetermined channel;

a control signal transmission unit for selectively transmitting one of a first control signal and a second control signal;

a control signal reception unit for receiving the first control signal and the second control signal; and a control unit for controlling the control signal transmission unit to transmit the first control signal when the detection unit has detected the absence of the signal transmitted on the predetermined channel in a case where the radio communication apparatus is a transmitting terminal, and for, in a case where the radio communication apparatus is a receiving terminal, controlling the control signal transmission unit to transmit the second control signal to the desired radio communication apparatus after the first control signal has been received by the control signal reception unit and the signal has been detected to be absent on the predetermined channel by the detection unit.

The control signal transmission unit may transmit the first control signal and the second control signal on a control channel, the data communication unit may perform the data communications on a data channel provided apart from the control channel, and the predetermined channel may be the control channel.

The control signal transmission unit may transmit the first control signal and the second control signal on the data channel, the data communication unit may perform data communications on the data channel, and the predetermined channel may be a control channel provided apart from the data channel.

The control unit may further comprise the following units:

a receiving terminal signal transmission control unit for controlling the signal transmission unit to start a transmission of the predetermined signal on the control channel at a predetermined time point after a detection of the absence of the signal transmitted on the control channel and before a commencement of the data communications, in a case the radio communication apparatus has received the first control signal.

The control unit may further comprise the following units:

a transmitting terminal signal transmission control unit for controlling the signal transmission unit to continue the transmission of the predetermined signal on the control channel while the control signal transmission unit is transmitting the first control signal.

According to these constructions, the same effects as the above mentioned method can be obtained.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 5 shows the detailed construction of the MAC unit 3 of the first embodiment.

FIGS. 6A and 6B show the constructions of the modem 4 for the data channel and the modem 5 for the busy tone channel respectively.

FIG. 11 is a table showing the average path loss in the case that HTP is present, which is used to simulate the throughput property of the radio communication apparatus of the first embodiment.

FIG. 18 is a flowchart depicting a CCON frame transmission operation of the radio communication apparatus of the third embodiment.

DESCRIPTION OF THE PREFERRED EMBODIMENTS

<Embodiment 1>

(The Frame Format)

First of all, frames to be transmitted to/from the radio communication apparatus of the first embodiment of the present invention is explained as follows.

Figure 1:
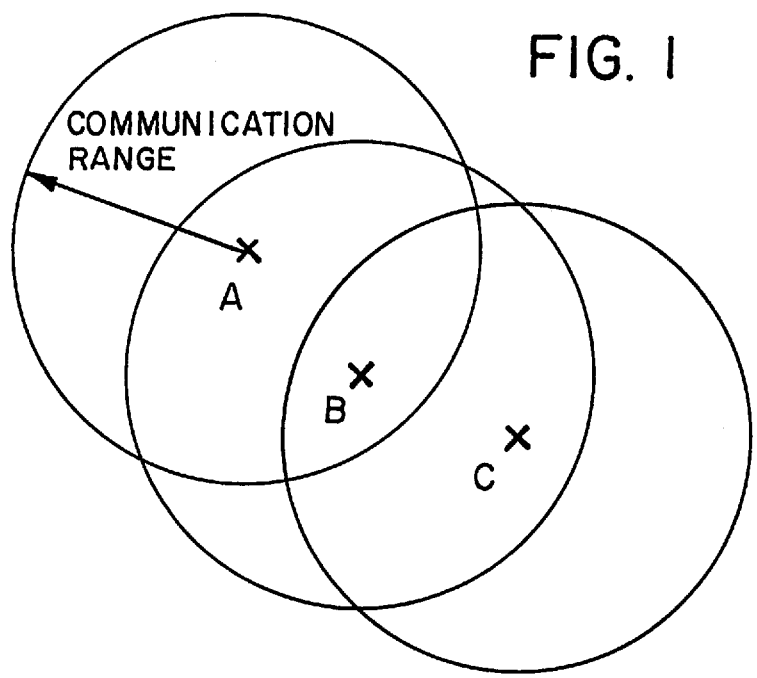
FIG. 1 is an illustration to be used to explain a HTP.
Figure 2:
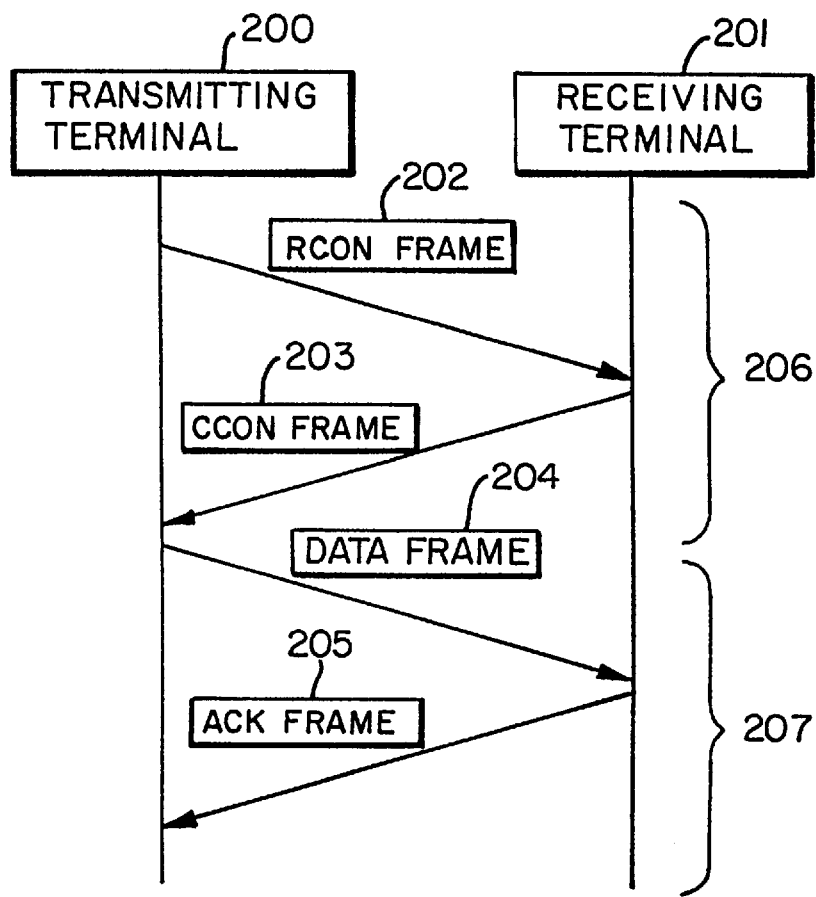
FIG. 2 shows the types of frames transmitted and received between two terminals in the first embodiment of the present invention.

FIG. 2 shows a frame transmission between two terminals. Here, a "frame" represent a minimum unit of information to be transmitted to/from the radio communication apparatus. The frames are classified into four types: an RCON (Request Connection) frame and a CCON (Confirm Connection) frame which are used for establishing a connection, and a DATA frame and an ACK (Acknowledgement) frame which are used for transmitting data.

As shown in FIG. 2, a transmitting terminal transmits an RCON frame, and a receiving terminal returns a CCON frame, thereby establishing a connection. In response to the establishment of the connection, the transmitting terminal transmits a DATA frame, and the receiving terminal returns an ACK frame, thereby completing the transmission of data for one frame. The transmission of the DATA frame and the ACK frame are repeated until all the necessary data are transmitted.

Figure 3A:
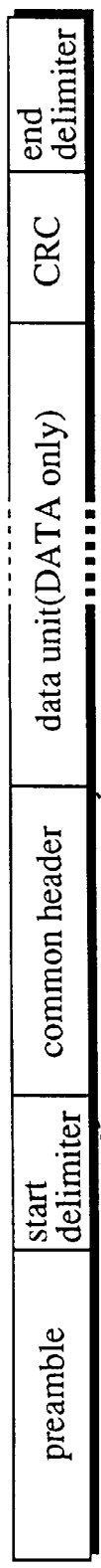
FIGS. 3A–3F show the formats of these frames of FIG. 2.

FIGS. 3A–3F show the formats of these frames. FIG. 3A shows components that all the frames commonly have, namely, preamble, start delimiter, common header, CRC (Cyclic Redundancy Check) code, and end delimiter. The DATA frame further has a data unit. The CRC code indicates information necessary for detecting bit errors.

Figure 3B:

FIG. 3B show the format of a common header, which consists of a type field, a destination address field, a source address field, and a sequence number field.

The type field carries the type of its frame. The most significant bit of the type field is called EOP (End of Packet) bit. In the case of RCON and CCON frames, the EOP bit always has a 0 value. In the case of DATA frames, the EOP bit is set to 1 value only when the frame is the last frame constructing a data packet sent from an upper layer protocol, and otherwise it is set to a 0 value. The EOP bit of an ACK frame is supposed to be equal to the EOP bit of the DATA frame which has been just confirmed.

The destination field carries a destination address.

The source address field carries the address of the radio communication apparatus, which tries to send the frame.

The sequence number field in an RCON frame carries the sequence number of the first DATA frame to be transmitted on a connection established by the use of the RCON frame. The sequence number field in a CCON frame carries the same sequence number as in the sequence number field in the RCON frame that is confirmed by the CCON frame. The sequence number field in a DATA frame carries a sequence number which indicates the order of the frame in the sequence. The sequence number field of an ACK frame carries the sequence number of the DATA frame that is confirmed by the ACK frame. In the case of the radio communication apparatus of the present embodiment, the sequence number has a 0 value when it is booted, and is incremented by one, every time the apparatus transmits a new DATA frame, which is not for retransmission. If a value 1 is added to the sequence number in the case that the sequence number is the maximum value to be obtained with the bit length of the sequence number field, the value becomes 0.

Figure 3C:
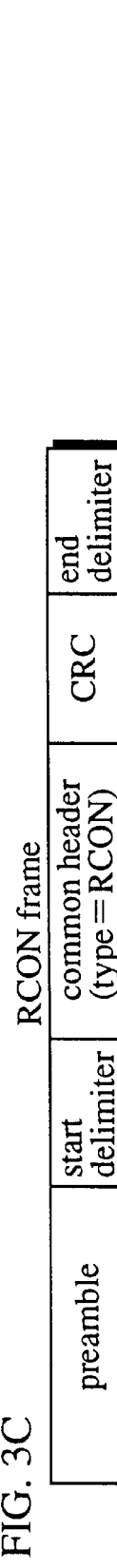

FIG. 3C shows the format of an RCON frame. An RCON frame does not have a data unit, its type field carries a value which is identified as an RCON frame, and its EOP bit always has a 0 value. The sequence number field carries the sequence number of the next coming DATA frame.

Figure 3D:
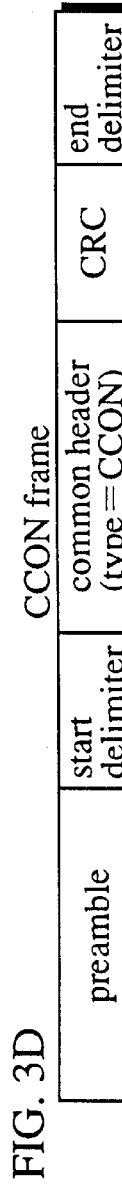

FIG. 3D shows the format of a CCON frame. A CCON frame does not have a data unit, its type field carries a value which is identified as a CCON frame, and its EOP bit always has a 0 value. The sequence number field carries the sequence number written in the RCON frame to be confirmed by the CCON frame.

Figure 3E:
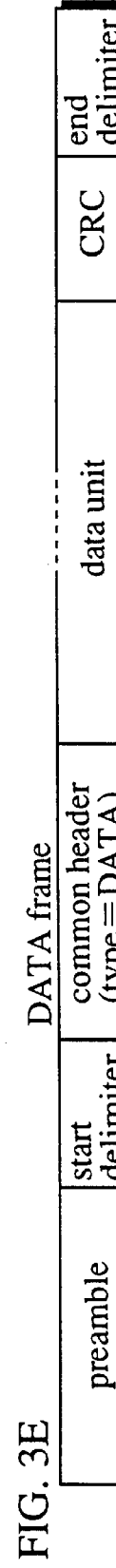

FIG. 3E shows the format of a DATA frame. A DATA frame has a data unit, and its type field carries a value which is identified as a DATA frame. The EOP bit is set to 1 in the case that the DATA frame is the last frame constructing a data packet sent from an upper layer protocol, and otherwise it is set to 0. The sequence number field carries the sequence numbers of the DATA frame, which represents the order of the DATA frame.

Figure 3F:
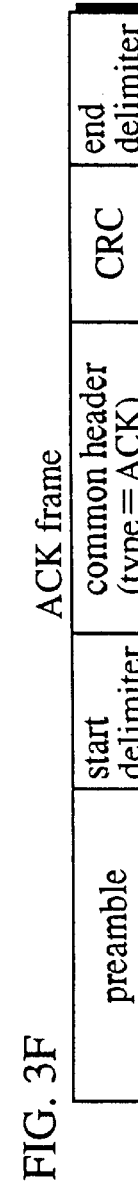

FIG. 3F shows the format of an ACK frame. An ACK frame does not have a data unit, and its type field carries a value which is identified as an ACK frame. Its EOP bit is supposed to be equal to the EOP bit of the DATA frame to be confirmed by the ACK frame. The sequence number field carries the same sequence number written in the DATA frame to be confirmed by the ACK frame.

(The Overall Construction of the Radio Communication Apparatus)

Figure 4:
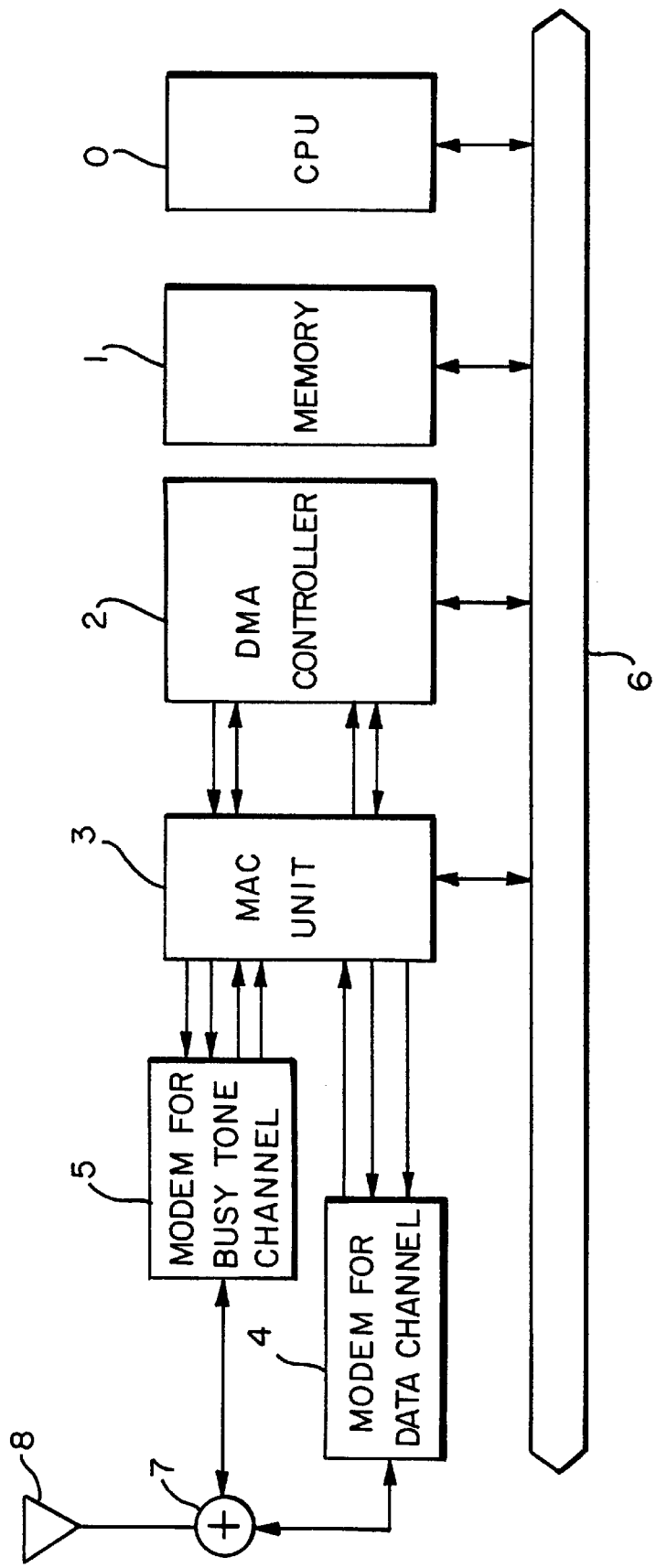
FIG. 4 shows the construction of the radio communication apparatus of the first embodiment.

FIG. 4 shows the construction of the radio communication apparatus of the present embodiment, composed of a CPU 0, a memory 1, a DMA controller 2, an MAC unit 3, a modem 4 for a data channel, a modem 5 for a busy tone channel, a bus 6, a duplexer 7, and an antenna 8.

The CPU 0 is in charge of data communication with the memory 1, frame generation, connection management, MAC unit 3 operation management, communication with users, and the entire apparatus management.

The memory 1 stores data to be transmitted and received data, frames generated or received by the CPU 0, and connection control tables generated by the CPU 0.

The DMA controller 2 performs data communications between the MAC unit 3 and the memory 1.

The MAC unit 3 is in charge of data format conversion between the memory 1 and the modems 4 and 5, frame border recognition, attachment and detachment of preambles, start delimiters, and end delimiters, generation and examination of CRC codes, and identification of received frame addresses.

The modem 4 for the data channel modulates a carrier wave having a frequency for the data channel with data sent from the MAC unit 3, thereby transmitting the modulated signal to the duplexer 7, and also detects data from a signal sent from the duplexer 7 to transmit them to the MAC unit 3.

The modem 5 for the busy tone channel modulates a carrier wave having a frequency for the busy tone channel with data sent from the MAC unit 3, thereby transmitting the modulated signal to the duplexer 7, and also detects data from a signal sent from the duplexer 7 to transmit them to the MAC unit 3. In the present embodiment, the radio waves having different frequency bands from each other are respectively assigned to the data channel and the busy tone channel.

The bus 6 is a medium for the exchange of control signals among the components of the radio communication apparatus, and for the data transmission between the memory 1 and the DMA controller 2.

The duplexer 7 distributes signals sent from the antenna 8 to the modem 4 for the data channel and to the modem 5 for the busy tone channel, depending on their frequency bands. The duplexer 7 also combines the signals sent from both modems 4 and 5, thereby forwarding them to the antenna 8.

The antenna 8 transmits and receives radio signals.

(The Construction of MAC Unit 3)

FIG. 5 shows the detailed construction of the MAC unit 3 which is composed of a MAC control unit 30, a FIFO 31 for reception, a FIFO 32 for transmission, a busy tone reception unit 33, a busy tone transmission unit 34, a data reception unit 35, a data transmission unit 36, and a busy tone determination unit 37.

The MAC control unit 30 controls each component of the MAC unit 3 and exchanges information with the CPU 0 via the bus 6, and further informs the modems 4 and 5 the timing for switching between the reception and transmission of frames via the signal conductors 302 and 303.

The FIFO 31 for reception and FIFO 32 for transmission are buffers for transmitting data to and receiving data from the DMA controller 2 respectively.

The busy tone reception unit 33 detects a frame head by detecting a start delimiter from a bit stream received through the modem 5 for the busy tone channel, and checks the destination address to determine whether the frame is destined for the apparatus. If it is destined for the apparatus, the busy tone reception unit 33 reports this to the MAC control unit 30, and transfers the received frame to the FIFO 31 for reception. The received frame is further transferred to the memory 1 by the DMA controller 2.

The busy tone transmission unit 34 transmits a frame sent from the FIF0 32 for transmission under the direction of the MAC control unit 30 through the modem 5 for the busy tone channel.

The data reception unit 35 detects a frame head by detecting a start delimiter from a bit stream received through the modem 4 for the data channel, and checks the destination address to determine whether the frame is destined for the apparatus. If it is destined for the apparatus, the data reception unit 35 reports it to the MAC control unit 30, and deletes the preamble, start delimiter, CRC code, and end delimiter from the received frame. Then, the data reception unit 35 transfers the rest of the received frame to the FIFO 31 for reception. The contents of the FIFO 31 is transferred to the memory 1 by the DMA controller 2.

The data transmission unit 36 generates a frame by adding the preamble, start delimiter, CRC code, and end delimiter to the contents of the FIFO 32 under the direction of the MAC control unit 30, and transmits the frame to the modem 4, thereby transmitting the frame on the data channel.

The data transmission from the memory 1 to the FIFO 32 is performed by the MAC controller 2.

The busy tone determination unit 37 observes the strength of a signal on the busy tone channel received by the modem 5 and determines whether the signal strength is beyond a predetermined one. The observed result is reported to the MAC control unit 30 via the signal conductor 304. The MAC control unit 30, prior to the transmission of an RCON frame or a CCON frame, performs a gap detection with a signal sent through the signal conductor 304, to detect whether the busy tone channel is free from a signal having more strength than determined for over a predetermined time period (gap time).

(The Construction of Modems 4 and 5)

FIG. 6A shows the construction of the modem 4 for the data channel.

The Rx/Tx switch 40 switches between the transmission mode and the reception mode under the direction of the MAC control unit 30.

Under the reception mode, signals from the duplexer 7 are sent to the demodulator 44 through the receiver 43, and further sent to the data reception unit 35 after detection, decision, and clock recovery have been applied.

Under the transmission mode, the modulator 42 modulates a carrier wave for the data channel by means of a bit stream sent from the data transmission unit 36, thereby generating modulated signals. The modulated signals are sent to the duplexer 7 through the transmitter 41.

The Rx/Tx switch 40, the transmitter 41, and the receiver 43, which are connected with the MAC control unit 30 through a signal conductor 302, operate under the direction of the MAC control unit 30.

Figure 6B:
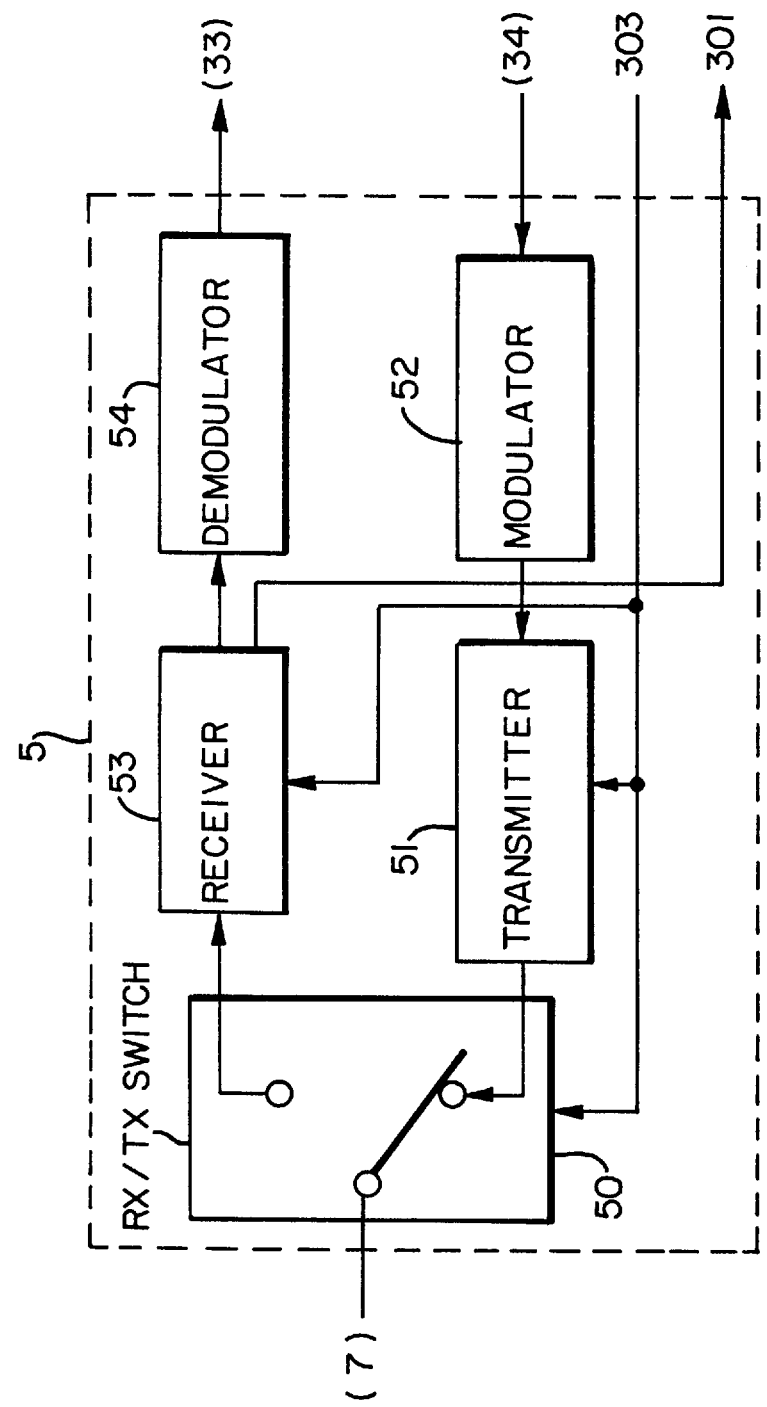

FIG. 6B shows the construction of the modem 5 for the busy tone channel, which is similar to the construction of the modem 4 shown in FIG. 6A. The receiver 53 and the busy tone determination unit 37 are connected to each other via a signal conductor 301, which informs the strength of a signal received on the busy. tone channel. The busy tone determination unit 37 determines whether there is a signal having more strength than predetermined by means of the signal conductor 301, then reports the result to the MAC control unit 30.

(Overall Operations of the Radio Communication Apparatus)

Figure 7:
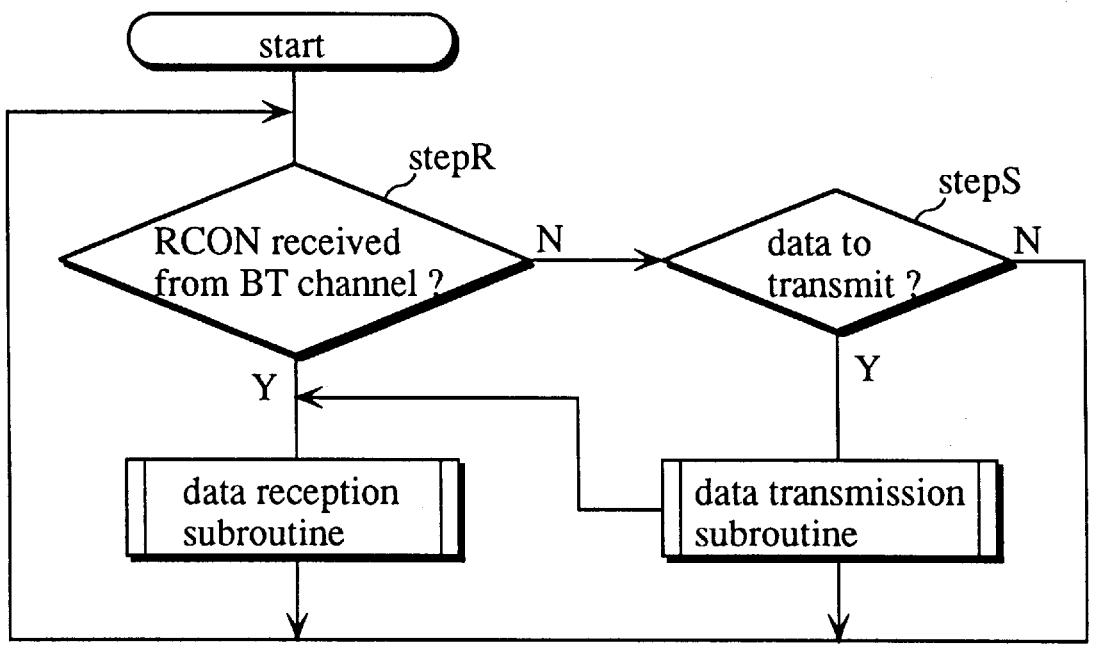
FIG. 7 is a flowchart showing the overall operations of the radio communication apparatus of the first embodiment.

FIG. 7 is a flowchart showing overall operations of the radio communication apparatus of the present embodiment. More detailed operations will be described later with reference to FIGS. 8 and 9.

Having received an RCON frame destined for itself on the busy tone channel (step R), the radio communication apparatus performs a data reception subroutine, and returns to the step R when the data reception has been completed.

Not having received an RCON destined for itself (step R), the radio communication apparatus determines whether there are data to be transmitted in the memory 1 (step S). When the presence of such data has been determined, the apparatus performs a data transmission subroutine, and returns to the step R. In contrast, when the absence of such data has been determined, the apparatus directly returns to the step R.

As will be described below, when an RCON frame destined for the apparatus has been received on the busy tone channel at an early stage of a connection establishing process, a data reception process has precedence over the data transmission process.

(Data Transmission Operations)

Detailed operations for data transmission of the radio communication apparatus are as follows.

Figure 8:
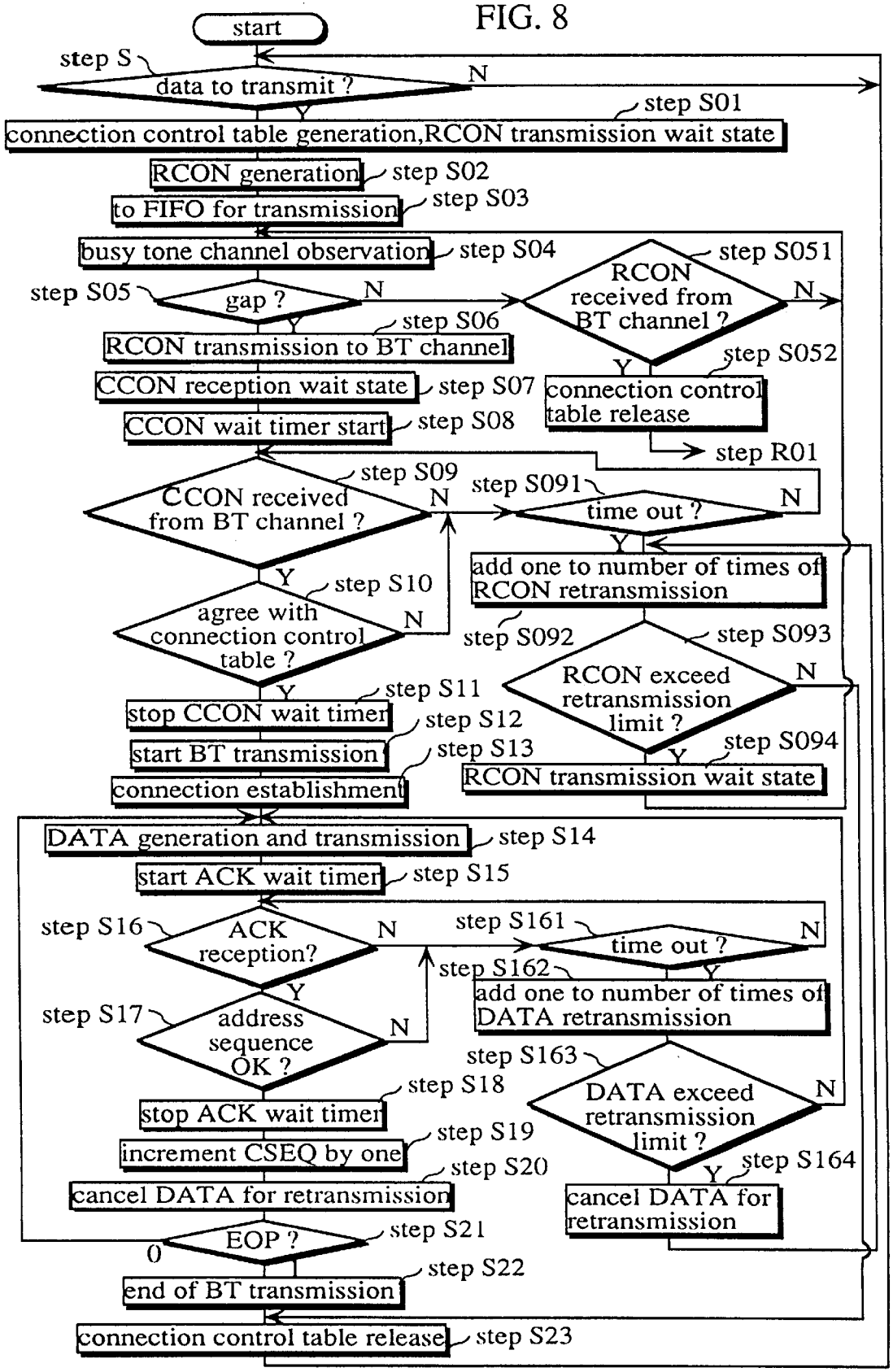
FIG. 8 is a flowchart showing the data transmission operation of the radio communication apparatus of the first embodiment.

FIG. 8 is a flowchart showing data transmission operations of the apparatus. When data to be transmitted have been stored to the memory 1 by means of an upper layer application (step S), the CPU 0 generates a connection control table and stores it to a predetermined area in the memory 1 (step S01). The connection control table includes the destination address for the data, the current value of the sequence number (hereinafter CSEQ), the maximum frame length inherent to the data channel to be used, the number of times to retransmit an RCON frame, the number of times to retransmit a DATA frame, and a connection state.

In step S01, the address of the receiving station is set to the destination address of the data to be transmitted, and CSEQ is set to a value to be obtained by adding 1 to the sequence number of the latest-transmitted DATA frame (hereinafter LSEQ). The numbers of times to retransmit an RCON frame and a DATA frame are both set to 0. The connection state is set to an RCON transmission wait state.

In data transmission, the CPU 0 stores CSEQ to a predetermined area in the memory 1 as LSEQ, every time a new DATA frame is transmitted, which is not for retransmission.

Then, the CPU 0 generates a common header of the RCON frame (hereinafter RCON header), and stores it to a predetermined area in the memory 1 (step S02). The parts other than the common header, namely, preamble, start delimiter, CRC code, end delimiter are generated in the busy tone transmission unit 34 and added to the RCON frame when it is transmitted.

The type field in the RCON header carries an identification of the type of RCON. The destination address field and the sequence number field respectively carry the destination address and CSEQ of the connection control table. The source address field carries the address of the apparatus.

The CPU 0 stores the generated RCON header to the FIFO 32 for transmission (step S03). To be more specific, the CPU 0 informs the DMA controller 2 of the leading address and the length of the RCON header in the memory 1. The DMA controller 2 serially stores data for the informed length starting from the informed address to the FIFO 32. The CPU 0 informs the MAC control unit 30 of the start of the data transmission as well as directing it to store the RCON header. The generated RCON header is held in the memory 1 until it is confirmed by the CCON frame.

The MAC control unit 30 starts to observe the conditions of the busy tone channel in accordance with the signal to be sent from the busy tone de-termination unit 37 to the signal conductor 304 (step S04). When the signal on the signal conductor 301 has less strength than the predetermined one, the busy tone determination unit 37 determines the absence of an effective signal on the busy tone channel, and transmits a low level signal through the signal conductor 304 to inform the MAC control unit 30 of the determination. In accordance with this, the MAC control unit 30 regards the absence of the effective signal for the predetermined gap time as the detection of a gap on the busy tone channel.

In response to the detection of the gap (step S05), the MAC control unit 30 switches the Rx/Tx switch 50 in the modem 5 to the transmitter, by sending a signal to the signal conductor 303, thereby setting the modem 5 to the transmitting mode. This signal is also used to initiate the transmitter 51. The MAC control unit 30 directs the busy tone transmission unit 34 and the FIFO 32 to transmit a frame. The busy tone transmission unit 34 generates a data stream including a preamble and a start delimiter at the head of an RCON header, and converts the data stream into a bit stream for the transmission path, and starts to transmit it to the modulator 52 of the modem 5. When the RCON header in the FIFO 32 has been all transmitted, the busy tone transmission unit 34 adds already calculated CRC code and the end delimiter to the end of the RCON header, converts it into a bit stream for the transmission path, and transmits it to the modulator 52. The modulator 52 modulates a carrier wave for the transmitted bit stream, and transmits the bit stream onto the busy tone channel through the transmitter 51, duplexer 7, and antenna 8 (step S06).

When the transmission of the end delimiter of the RCON frame to the modulator 52 has been completed, the busy tone transmission unit 34 informs the MAC control unit 30 of the completion of the transmission. The MAC control unit 30 waits until the modem 5 completes the transmission of the RCON frame, then switches the Rx/Tx switch 50 to the receiver, by sending a signal to the signal conductor 303. As a result, the modem 5 for the busy tone channel is set to the reception mode. This signal is also used to initiate the receiver 53. Then, the MAC control unit 30 informs the CPU 0 of the completion of the RCON frame transmission. The CPU 0 changes the connection state of the connection control table in the memory 1 to the CCON reception wait state (Step S07). Then, the CPU 0 starts the CCON wait timer with 0 as the initial value (step S08).

When a signal on the busy tone channel is received by the receiver 53 in the modem 5 and sent to the busy tone reception unit 33 through the demodulator 54 in the form of a bit stream, the busy tone reception unit 33 finds out the bit pattern of the start delimiter from the bit stream, and regards the bits following the start delimiter as a frame. Judging the frame to be destined for the apparatus, the busy tone reception unit 33 reports it to the MAC control unit 30, and converts the received frame from the bit stream for the transmission path into a data stream until the end delimiter is detected, storing them to the FIFO 31 for reception. The end delimiter is not stored to the FIFO 31. The busy tone reception unit 33 examines the CRC of the frame. Prior to the frame storage to the FIFO 31, the MAC control unit 30 sends a control signal to the FIFO 31 to enable the writing of data from the busy tone reception unit 33.

The DMA controller 2 transfers frames stored in the FIFO 31 to the memory 1. To be more specific, the DMA controller 2, which holds the leading address and length of the preserved area on the memory 1, starts to transfer the contents of the FIFO 31 from the site of the leading address, and interrupts in the CPU 0 when all the contents of the FIFO 31 have been stored or when the stored data has reached the length. In this embodiment, the preserved area in the memory 1 is supposed to be large enough to store at least one frame including a DATA frame. Under such assumption, the DMA controller starts an interruption when all the contents of the FIFO 31 have been stored in the memory 1.

Having detected a CRC error in the process of CRC examination, the busy tone reception unit 33 reports it to the MAC control unit 30. The MAC control unit 30 makes an interruption to inform the CPU 0 of the CRC error. The CPU 0 directs the DMA controller 2 to transmit next data to the very area in the memory 1 where the frame with the CRC error is stored, thereby eliminating the frame.

Receiving the interruption which informs the completion of the frame storage, and not receiving the interruption which informs the detection of the CRC error, the CPU 0 checks the type field of the frame stored in the memory 1. When the type is CCON (step S09), the contents of the source address field and the sequence number field are compared with the contents of the connection control table. When they agree (step S10), the CPU0 stops the CCON wait timer (step S11), and deletes the RCON header held in the memory 1 for retransmission.

Then, the CPU 0 directs the MAC control unit 30 to start busy tone transmission. The MAC control unit 30 sends a signal to the signal conductor 303 to switch the Rx/Tx switch 50 in the modem 5 to the transmitter, thereby setting the modem 5 to the transmission mode. The signal is also used to initiate the transmitter 51. The MAC control unit 30 directs the busy tone transmission unit 34 to start to transmit a bit stream including a predetermined iterative bit pattern for busy tones to the modulator 52 in the modem 5. The modulator 52 modulates the received bit stream in accordance with the frequency band and the modulation scheme for the busy tone channel, and starts to transmit it on the busy tone channel through the transmitter 51 (step S12).

Directing the MAC control unit 30 to start a busy tone transmission, the CPU 0 updates the connection information on the connection control table with the contents indicating the connection establishment state (step S13). Thus, the connection has been established.

Then, the CPU 0 generates a DATA frame smaller than the maximum size held in the connection control table from data on the memory 1, and sends the DATA frame on the data channel (step S14).

To be more specific, the CPU 0 generates a common header of a DATA frame (hereinafter DATA header) from the connection control table. The type field in the DATA header has an identification of the type of DATA. The destination address field has the address of the receiving station in the connection control table. The source address field has the address of the apparatus. The sequence number field has the CSEG of the connection control table. Then, the CPU 0 takes out data held in the memory 1, deducting the total length for the preamble, start delimiter, common header, CRC code, and end delimiter from the maximum frame length on the connection control table, and links the taken data to the end of the DATA header as a data part. When the data part includes the end bit of the data held on the memory 1, the EOP bit of the type field is set to 1, and otherwise it is set to 0. The DATA header linked with a data part is called a partial DATA frame hereinafter. The partial DATA frame, which is obtained by deducting the preamble, start delimiter, CRC, and end delimiter from the DATA frame, is a main part of a DATA frame. The CPU 0 stores a partial DATA frame thus generated to a predetermined area in the memory 1. The partial DATA frame is kept for retransmission even after it has been transmitted on the data channel until an ACK frame to confirm the DATA frame is received.

Then, the CPU 0 directs the MAC control unit 30 to transmit a DATA frame, and further directs the DMA controller 2 to start the transmission of the partial DATA frame on the memory 1 to the FIFO 32. The transmission is performed in the same manner as the transmission of the RCON header explained in step S03.

The MAC control unit 30 sends a signal to the signal conductor 302 to switch the Rx/Tx switch 40 in the modem 4 to the transmitter, setting the modem 4 to the transmission mode. The signal is also used to initiate the transmitter 41. The MAC control unit 30 directs the data transmission unit 36 and the FIFO 32 to start a frame transmission. Then, the data transmission unit 36 converts a data stream composed of a partial DATA frame, a preamble, and start delimiter into a bit stream for the transmission path, starting to transmit it to the modulator 42 in the modem 4. The data transmission unit 36 calculates a CRC code during the transmission of the bit stream. After the transmission of the partial DATA frame, the data transmission unit 36 adds the calculated CRC code and end delimiter to the end of the partial DATA frame, and sends it to the modulator 42 in the form of a bit stream for the transmission path. The modulator 42 modulates a carrier wave for the transmitted bit stream in accordance with the frequency band and modulation method for the data channel, and transmits its bit stream on the data channel via the transmitter 41, the duplexer 7, and the antenna 8.

Completing the transmission of the end delimiter, the data transmission unit 36 reports this to the MAC control unit 30. The MAC control unit 30 waits until the modem 4 completes the transmission of the DATA frame, then switches the Rx/Tx switch 40 to the receiver by sending a signal to the signal conductor 302, setting the modem 4 to the reception mode. The signal is also used to initiate the receiver 43. Then, the MAC control unit 30 informs the CPU 0 of the completion of the DATA frame transmission.

Informed of the completion of the DATA frame transmission, the CPU 0 starts the ACK wait timer, with 0 as the initial value (step S15).

When a signal on the data channel has been sent to the receiver 43 in the modem 4 and further to the data reception unit 35 in the form of a bit stream through the demodulator 44, the data reception unit 35 finds out the bit pattern of the start delimiter from the bit stream, and regards the bits following the start delimiter as a frame. Recognizing that the frame is destined for the apparatus, the data reception unit 35 reports it to the MAC control unit 30, and starts to store the received frame to the FIFO 31 for reception. Prior to the frame storage to the FIFO 31, the MAC control unit 30 sends a control signal to the FIFO 31 to enable the writing of data from the data reception unit 35. The data reception unit 35 examines the CRC in the same manner as the reception a CCON frame in step S09. When a CRC error has been detected, it is processed in the same manner as explained in the reception of a CCON frame.

In response to the start of storing a data stream to the FIFO 31 for reception, the DMA controller 2 starts to transfer a frame stored in the FIFO 31 to the memory 1 in the same manner as explained in the CCON frame transmission in step S09. If the DMA controller 2 makes an interruption to the CPU 0 to report the completion of the frame storage, and there is no CRC error, then the CPU 0 checks the type field of the frame to determine whether the frame is an ACK frame (step S16). If it is an ACK frame, then the contents of the source address field and the sequence number field are compared with the address of the destination station and .CSEQ in the connection control table (step S17). When they agree, the CPU 0 stops the ACK wait timer (step S18), and increments the value of CSEQ on the connection control table by one (step S19). Furthermore, the CPU 0 releases the area in the memory 1 where DATA frames which are held for retransmission is stored (step S20).

The CPU 0 checks the EOP bit of the received ACK frame (step S21), and when the bit has a 0 value, the operation goes back to step S14 to transmit the rest of the data.

When the bit has a 1 value, the CPU 0 considers that all the data to be transmitted in the memory 1 have been successfully received by the destination station, and directs the MAC control unit 30 to terminate the busy tone transmission. The MAC control unit 30 directs the busy tone transmission unit 34 to stop the busy tone transmission (step S22). Then the MAC control unit 30 sends a signal to the signal conductor 303 to switch the Rx/Tx switch 50 in the modem 5 to the receiver, thereby setting the modem 5 to the receptions mode. This signal is also used to initiate the receiver 53. The MAC control unit 30 reports the completion of the busy tone transmission to the CPU 0. After the completion of the busy tone transmission, the CPU 0 clears the contents of the connection control table (step S23), and returns to the start.

Recognizing the reception of an RCON frame destined for the apparatus on the busy tone channel (step S051) in the same manner as explained in the reception of the CCON frame in step S09 before a gap is detected in step S05, the CPU 0 clears the connection control table (step S052) and proceeds to step R01 to carry out a data reception process which will be described below. Until an RCON frame is received, the CPU 0 continues to observe the busy tone channel back in the step S04.

If the value of the CCON wait timer has reached the maximum wait time for the connection establishment confirmation without the reception of a CCON frame on the busy tone channel in the step S09 (step S091), the CPU 0 updates the number of times of RCON frame retransmission on the connection control table by adding one (step S092). Then, the CPU 0 checks whether the number of times of the RCON frame retransmission. has reached the predetermined maximum number of times for the connection establishment request (step S093). If it has reached the number, the operation goes to step S23 to clear the connection control table, and returns to the start of the operation. If it has not reached the number, the CPU 0 put the connection information on the connection control table back to the RCON frame transmission wait state (step S094), and returns to the step S03 to retransmit an RCON frame including an RCON header held in the memory 1 for retransmission.

(Data Reception Operations)

Operations for data reception of the radio communication apparatus of the present embodiment is described as follows with reference to the FIG. 9.

Recognizing the reception of an RCON frame on the busy tone channel (step R) in the same manner as explained in the reception of the CCON frame in step S09, the CPU 0 generates a connection control table and stores it in a predetermined area in the memory 1 (step R01). In the step R01, the address of the destination station and CSEQ on the connection control table are respectively set to the contents of the destination address field and the sequence number field of the received RCON frame. The numbers of times of RCON frame retransmission and DATA frame retransmission are set to any values, and the connection state is set to the CCON transmission wait state.

Then, the CPU 0 generates a common header of a CCON frame (hereinafter CCON header) and stores it in a predetermined area in the memory 1 (step R02).

The type field in the CCON header has an identification of the type of CCON frame. The destination address field and the sequence number field respectively have the address of the destination station and CSEQ on the connection control table. The source address field has the address of the apparatus. The CPU 0 transfers the generated CCON header to the FIFO 32 in the same manner as explained in the step S03 (step R03), and at the same time, directs the MAC control unit 30 to start a CCCON frame transmission. Furthermore, the CPU 0 initiates the gap wait timer with an initial value 0 (step R04).

The MAC control unit 30 starts to observe the busy tone channel in the same manner as in the steps S04 and S05 (step R05), to determine whether a gap has been detected from the busy tone channel (step R06).

In the case where a gap has been detected, a CCON frame is generated from the CCON header in the FIFO 32, and transmitted on the busy tone channel (step R07).

Completing the transmission of the end delimiter of the CCON frame, the busy tone transmission unit 34 reports it to the MAC control unit 30. The MAC control unit 30 waits until the modem 5 completes the transmission of the CCON frame, then switches the Rx/Tx switch 50 to the receiver by sending a signal to the signal conductor 303, setting the modem 5 to the reception mode. The signal is also used to initiate the receiver 53. Then, the MAC control unit 30 informs the CPU 0 of the completion of the CCON frame transmission. Receiving the information, the CPU 0 stops the gap wait timer (step R08).

The CPU 0 waits for an estimated propagation delay of the CCON frame, to be caused between the apparatus and the destination terminal (step R09), and directs the MAC control unit 30 to start the busy tone transmission, which is started in the same manner as in the step S12 (step R10). Then, the CPU 0 changes the connection state on the connection control table to the connection establishment state (step R11), to initiate the connection holding timer with an initial value 0 (step R12).

When a frame on the data channel destined for the apparatus has been stored in the memory 1 in the same manner as an ACK frame is received in the step S16, the CPU 0 determines whether it is a DATA frame or not by checking the type field (step R13). If it is a DATA frame, then the CPU 0 compares the contents of the source address field with the address of the destination terminal on the connection control table (step R14). If they agree, the CPU 0 further compares the contents of the sequence number field (hereinafter RSEQ) with the CSEQ on the connection control table. If the RSEQ and the CSEQ agree (step R15), then the data part in the received DATA frame is taken out and stored in the predetermined area (step R16). The CPU 0 further increments the CSEQ on the connection control table by one (step R17).

Then, an ACK frame, which confirms the reception of the DATA frame is generated and transmitted in the same manner as the generation and the transmission of a DATA frame in the step S14 (step R18). The address of the destination terminal and RSEQ on the connection control table are respectively written into the destination address field and the sequence number field of the ACK frame being transmitted. The EOP bit of the received DATA frame is written on the EOP bit of the ACK frame. The completion of the ACK frame transmission is reported to the CPU 0 through the data transmission unit 36 and the MAC control unit 30 in the same manner as in the step S14.

In response to the report, the CPU 0 initiates the connection holding timer again with an initial value 0 (step R19).

The CPU 0 checks the EOP bit of the received DATA frame (step R20), and in the case that the value is 0, goes back to the step R13 to wait for the reception of a DATA frame from the destination station. In the case that the EOP bit has a 1 value, the CPU 0 waits until the connection hold timer reaches a predetermined maximum connection hold time (step R21), and terminates the busy tone transmission in the same manner as explained in the step S22 (step R22). Being informed of the completion of the busy tone transmission through the busy tone transmission unit 34 and the MAC control unit 30, the CPU 0 clears the connection control table (step R23) and returns to the start. If the gap wait timer has reached its maximum without the detection of a gap in the step R09 (step R061), the operation proceeds to the step R23 to release the connection control table and returns to the start.

If the connection holding timer has reached the predetermined maximum connection hold time without the reception of a DATA frame in the step R13 (step R131), the CPU 0 proceeds to step R22 to terminate the busy tone transmission, regarding the connection as being disconnected. Then, the CPU clears the connection control table and goes back to the start.

When the RSEQ and the CSEQ do not agree in the step R15, the received DATA frame is abandoned (step R151). When t:e RSEQ is smaller than the CSEQ (step R152), it is regarded as double reception, and the operation proceeds to step R18, skipping to take out a data part or to update the CSEQ. In the step R18, an. ACK frame. to confirm the DATA frame is generated and transmitted to perform the subsequent process.

When the RSEQ is larger than the CSEQ, it is regarded as an abnormal frame, and the operation directly goes back to step R13.

Before the connection is released in the step R21, if a DATA frame is received from the destination terminal while the CPU 0 is waiting the connection hold timer to reach its maximum (step R211), the CPU 0 generates and transmits the ACK frame to confirm the DATA frame (step R212), initiates the connection hold timer again (step R213), and goes back to step R21.

(Effects)

As apparent from the explanation hereinbefore, according to the radio communication apparatus of the present embodiment;, both the transmitting terminal and the receiving terminal are transmitting a busy tone on the busy tone channel when they are n data communication. Another terminal which is ready to start transmission must confirm that there is no busy tone on the busy tone channel. Consequently, all the terminals in the communication range of these transmitting and receiving terminals know that these two are in communication, so that they do not disturb it. The HTP is avoided in such a manner according to the radio communication apparatus of the present embodiment.

Furthermore, two terminals within a certain communication range can establish a connection and exchange data without a third terminal such as a base station, so that a distributed environment can be realized.

Furthermore, the entire network is prevented from becoming unable to communicate due to a failure of the base station.

Once a connection has been established between a transmitting terminal and a receiving terminal, all the data frames constituting a data packet are repeatedly transmitted. While the data frames are being repeatedly transmitted, busy tones are transmitted continuously, so that the data communication between the two terminals is not disturbed box other terminals. Consequently, the radio communication apparatus of the present embodiment has data transmission with higher efficiency than other systems that demand a connection establishment for each data frame.

Figure 10:
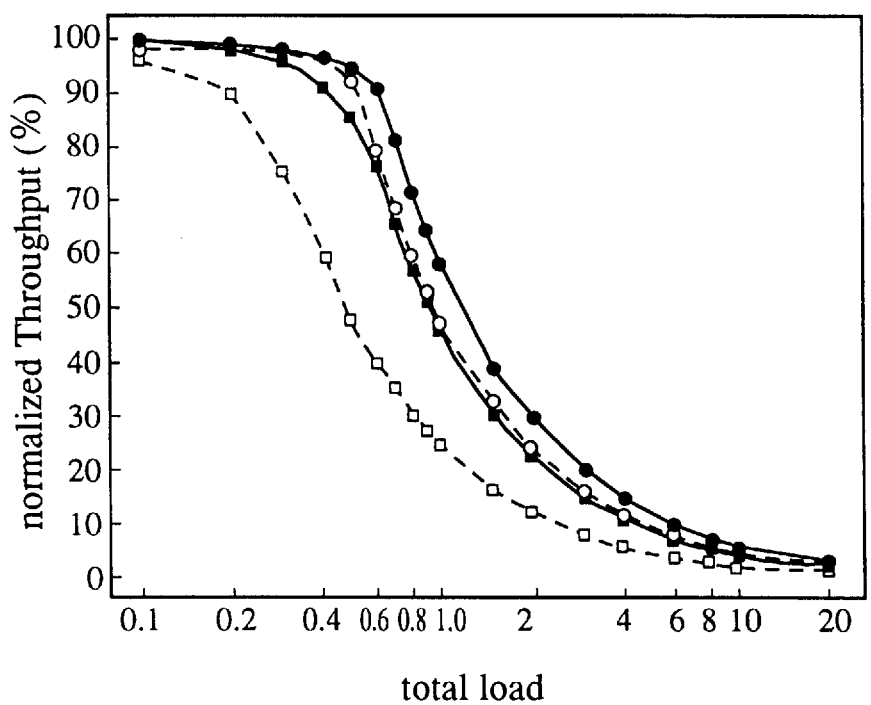
FIG. 10 is a graph showing the results of a numerical simulation of the throughput property of the radio communication apparatus of the first embodiment.

FIG. 10 is a graph showing the results of a numerical simulation of the throughput property of the radio communication apparatus of the present embodiment together with the results of CSMA/CA+Ack system for comparison.

According to the simulation, a 1500 byte data packet is sent as 128 byte data frames, and the network is composed of 9 terminals: A1–A3, B1–B3, and C1–C3. The 9 terminals are divided into 3 sub groups: A, B, and C, and communications are carried out within each sub group. However, each terminal sometimes receives a frame transmitted from another sub group, causing a frame collision. The maximum confirmation wait time is set to be 1.2 times of the sum of a data frame propagation delay and a confirmation frame propagation delay. The data frames which have not been confirmed by the acknowledgement frame is retransmitted 5 times at most. If at least one of the data frames constituting a data packet has failed to reached the destination station, it is considered that the transmission of the entire data packet has been unsuccessful.

The presence and absence of HTP are expressed by using two types of average path loss, assuming that the path loss between two terminals obeys a Rayleigh fading. The average path loss in the case that HTP is present is shown in FIG. 11, and the average path loss in the case that HTP is absent is fixed to 87 dB. When the path loss is over 115 dB, a frame is assumed to be dropped.

In FIG. 10, the horizontal axis indicates the total load of all the terminals normalized at a transmission rate unique to the data channel. The total load is one of the parameters for the simulation, and indicates a degree of the data transmission congestion in the entire network. The vertical axis indicates the total throughput (normalized throughput) of all the terminals normalized with the total load. The normalized throughput is obtained from the simulation and represents the rate of successful data transmission.

As shown in FIG. 10, the radio communication method of the present invention can produce higher throughput, and is less affected by the HTP than the CSMA/CA+Ack scheme. As a result, higher efficiency of data transmission can be realized.

<Embodiment 2>

The second embodiment of the present invention will be described hereinafter in which the like components are labeled with like reference numerals with respect to the first embodiment, and the description of these components is not repeated. The busy tone channel and the data channel are assigned different frequency bands from each other just like in the first embodiment.

The present embodiment is different from the first embodiment in that a data channel is used for a connection establishment with an RCON frame and a CCON frame, instead of a busy tone channel.

(The Entire Construction of the Radio Communication Apparatus)

The radio communication apparatus of the present embodiment has the same fundamental construction as the first embodiment shown in FIG. 4; however, the MAC unit 3 and the modem 5 for the busy tone channel are constructed differently from their equivalents in the first embodiment shown in FIGS. 5 and 6. The frames used in this embodiment are equal to those used in the first embodiment shown in FIGS. 3A–3E; however RCON frames and CCON frames to be transmitted on the busy tone channel in the first embodiment are transmitted on the data channel.

(The Construction of the MAC Unit 3)

Figure 12:
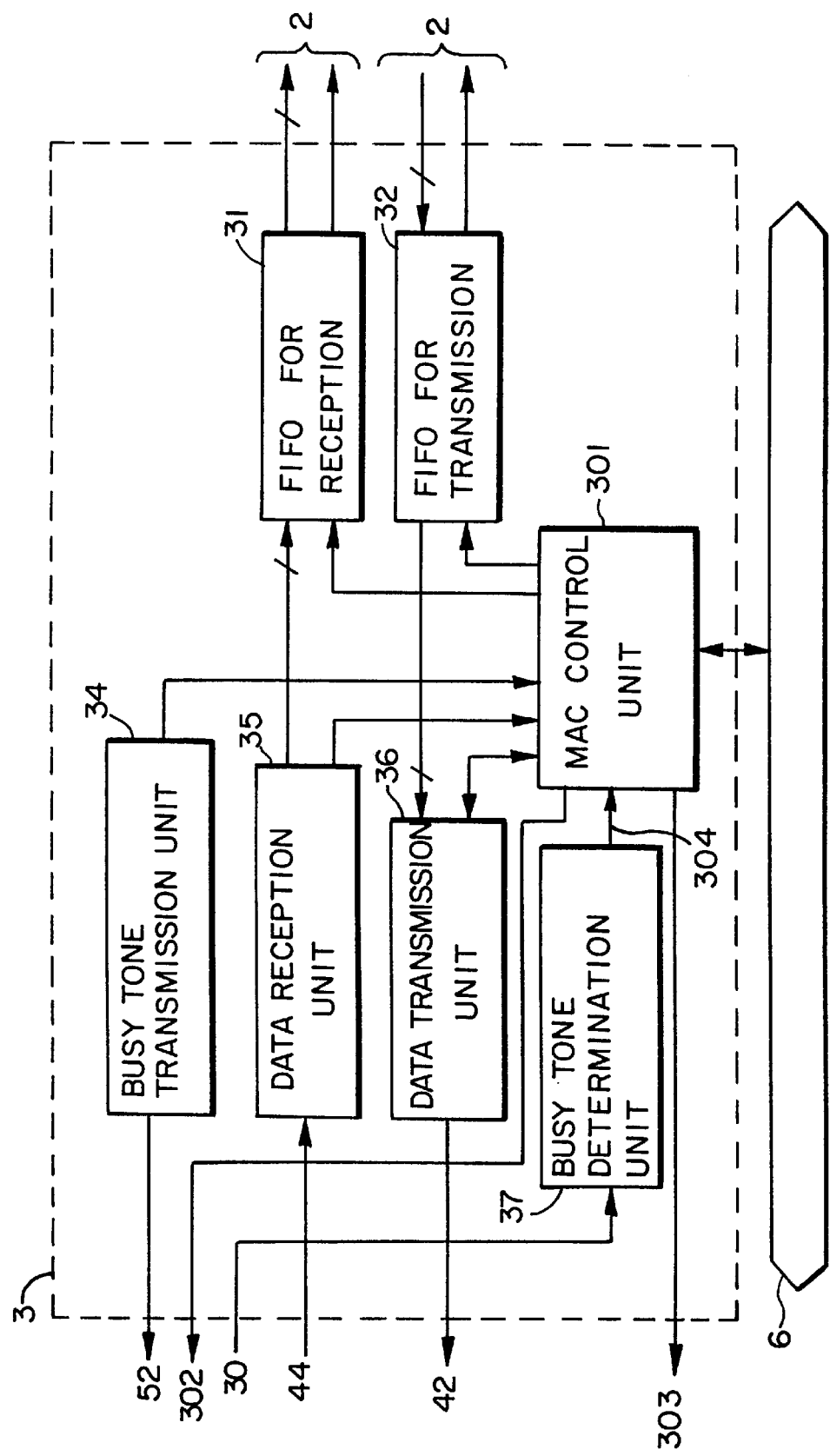
FIG. 12 is a block diagram showing the detailed construction of the MAC unit 3 of the second embodiment.

FIG. 12 is a block diagram showing the construction of the MAC unit 3 of this embodiment. FIG. 12 is different from FIG. 5 showing the construction of the MAC unit 3 of the first embodiment in that there are no busy tone reception unit 33 and no data line extending from the FIFO 32 to the busy tone transmission unit 34. The busy tone transmission unit 34 of this embodiment transmits busy tones only, and the RCON frames and the CCON frames are transmitted by the data transmission unit 36.

(The Construction of the Modem 5)

Figure 13:
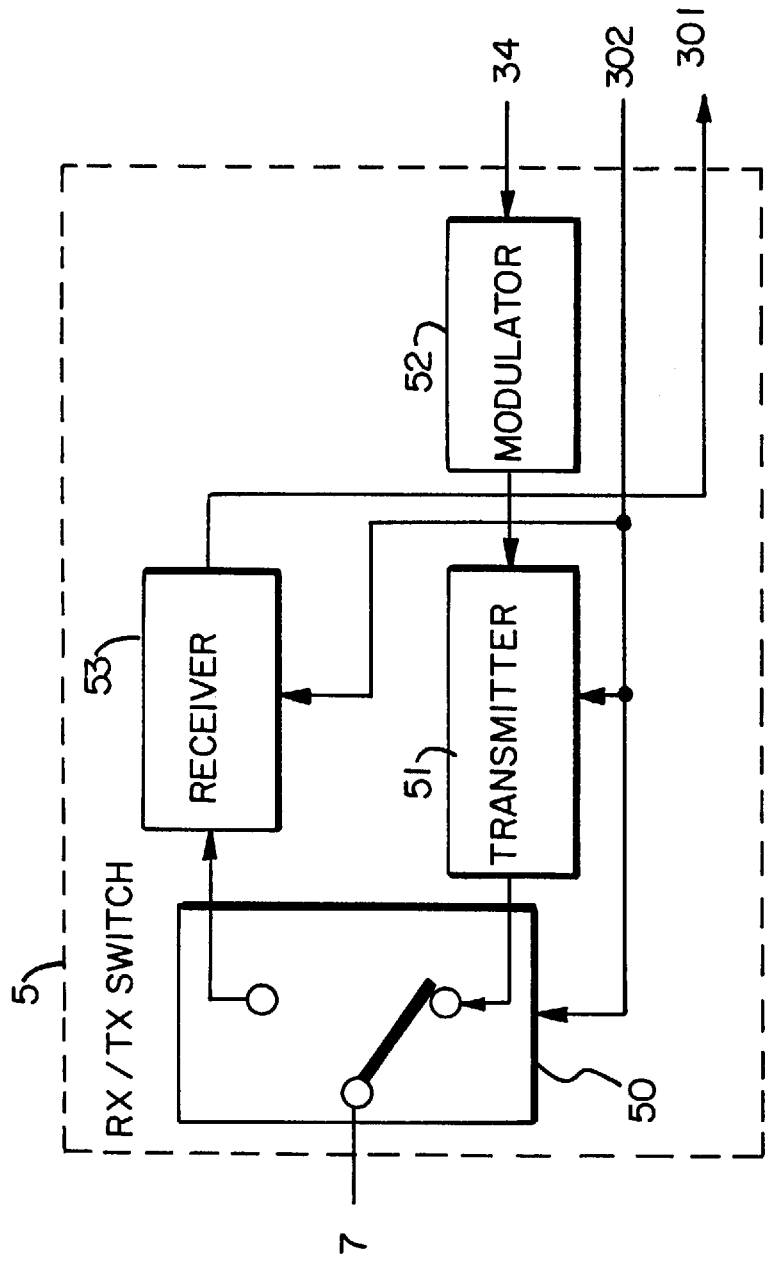
FIG. 13 is a block diagram showing the construction of the modem 5 for the busy tone channel of the radio communication apparatus of the second embodiment.

FIG. 13 is a block diagram showing the construction of the modem 5 for the busy tone channel of the radio communication apparatus of this embodiment. FIG. 13 is different from FIG. 6B showing the construction of the modem 5 of the first embodiment in that there is no demodulator 54 provided.

(Operations of the Entire Radio Communication Apparatus)

Figure 9:
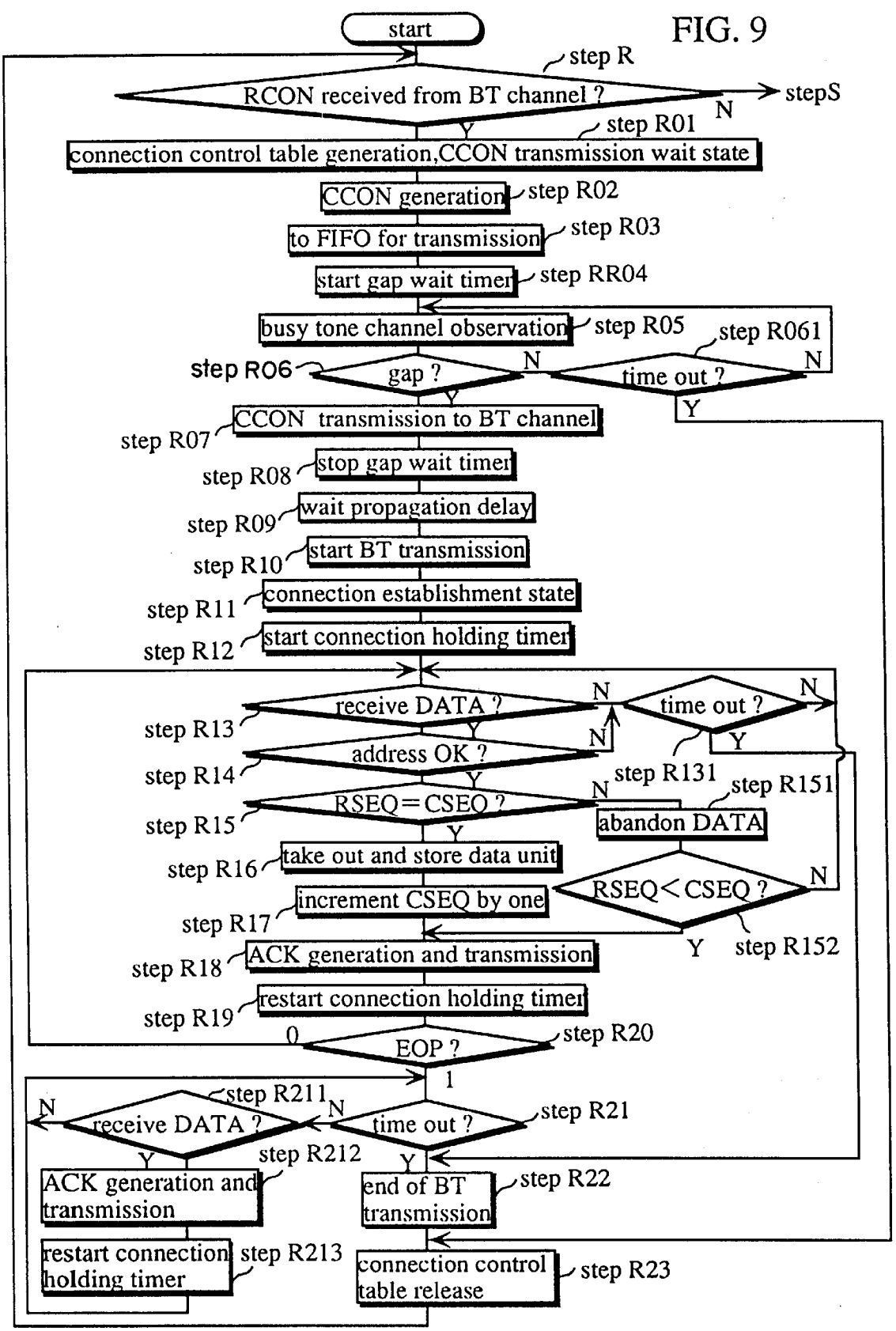
FIG. 9 is a flowchart showing the data reception operation of the radio communication apparatus of the first embodiment.
Figure 14:
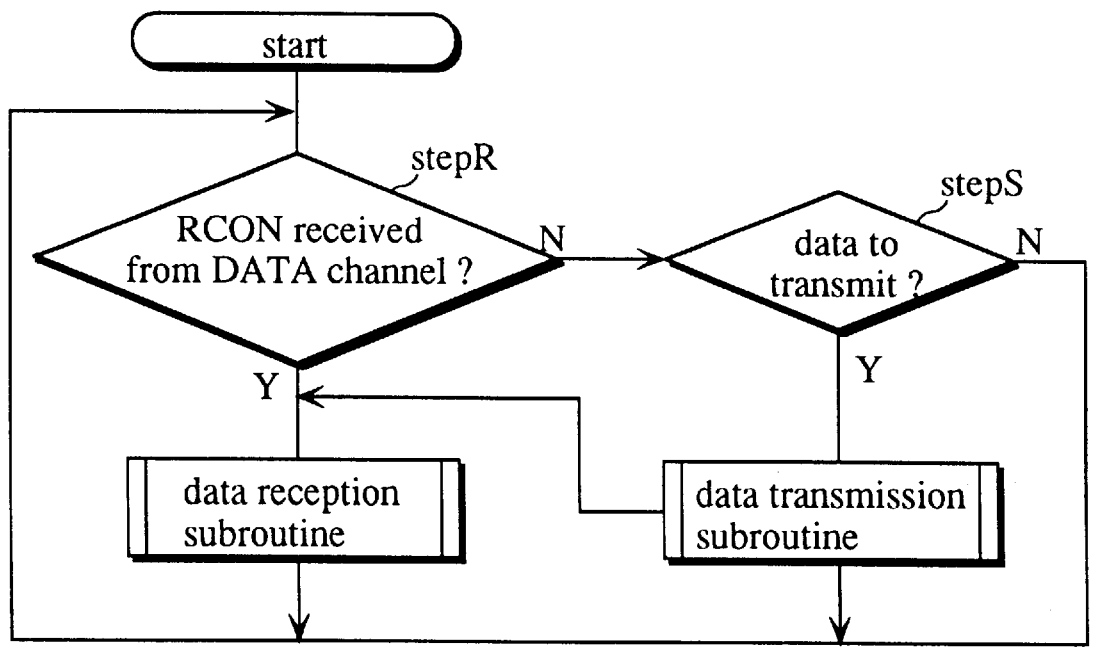
FIG. 14 is a flowchart showing the overall operation of the radio communication apparatus of the second embodiment.
Figure 15:
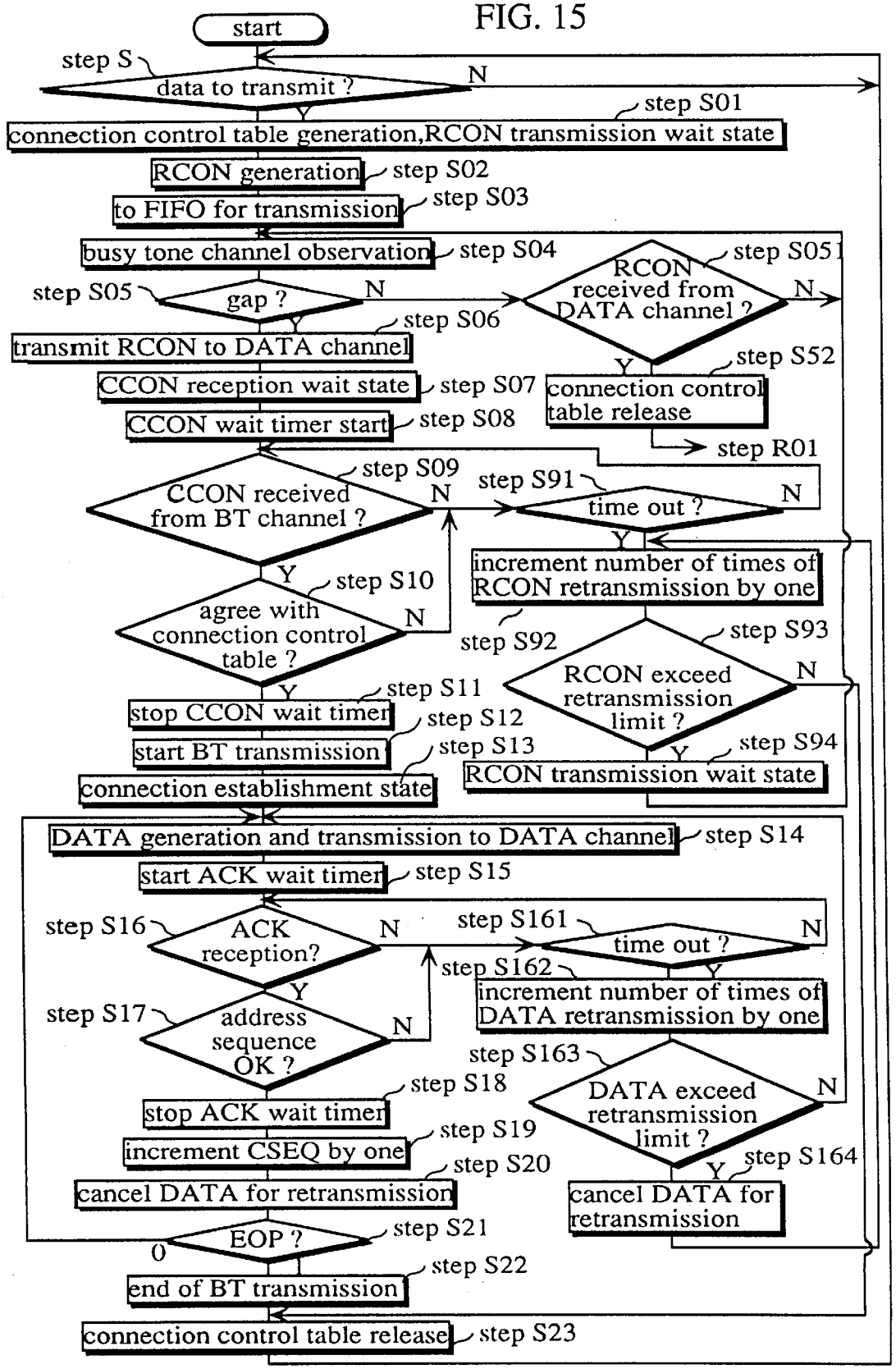
FIG. 15 is a flowchart showing the data transmission operation of the radio communication apparatus of the second embodiment.
Figure 16:
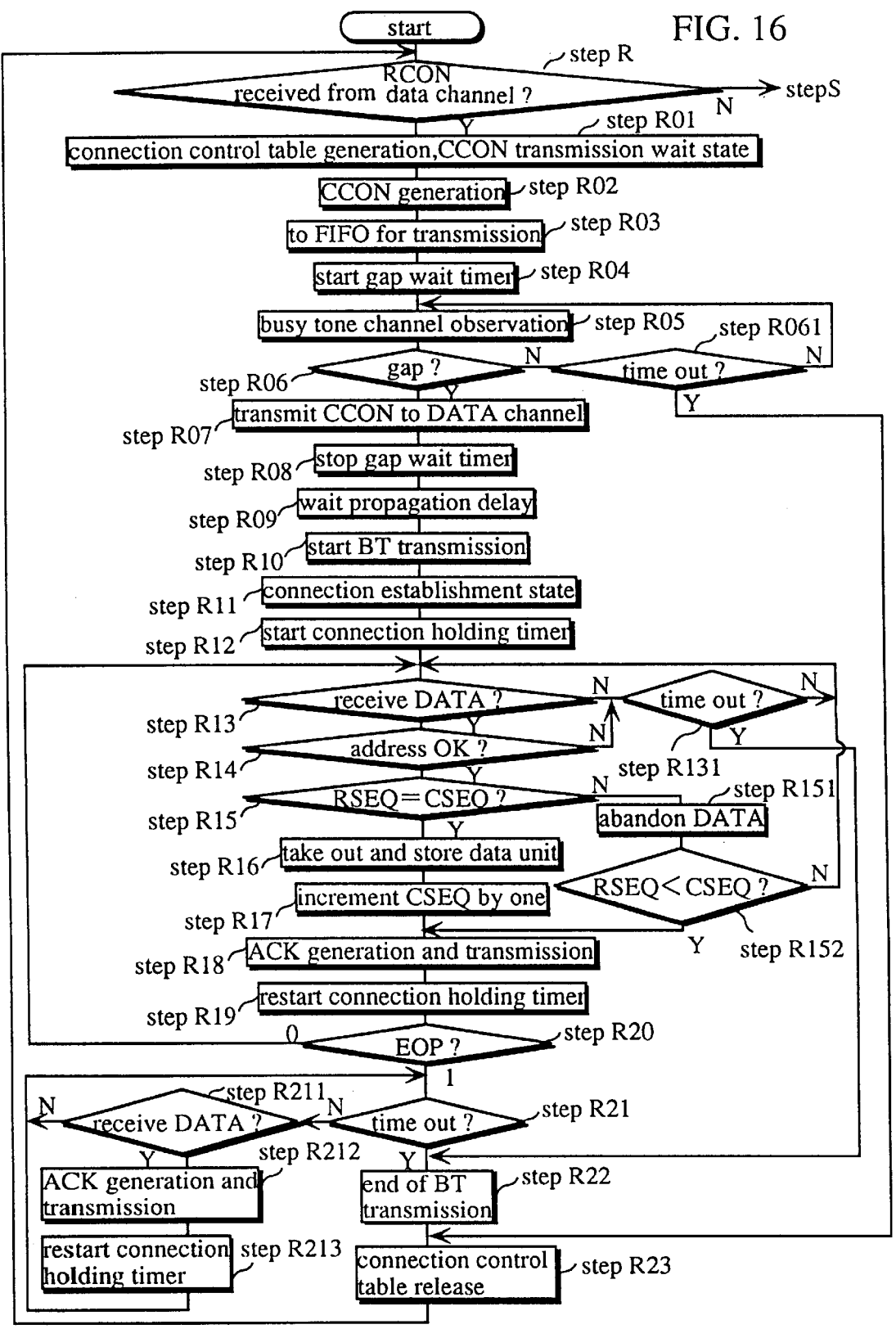
FIG. 16 is a flowchart showing the data reception operation of the radio communication apparatus of the second embodiment.

FIGS. 14–16 are flowcharts depicting operations of the radio communication apparatus of this embodiment, which respectively correspond to FIGS. 7–9 of the first embodiment. FIG. 14 shows the overall operation of the radio communication apparatus, FIG. 15 shows the data transmission operation, and FIG. 16 shows the data reception operation. The same operations as the first embodiment are not explained.

In the flowchart of FIG. 14, the radio communication apparatus performs a data reception subroutine when received an RCON frame destined for the apparatus (step R). After the completion of the data reception, the operation goes back to step R.

In the case that the apparatus has not received an RCON frame destined for the apparatus (step R), it determines whether there are data to be transmitted in the memory 1 (step S). When there are such data, the apparatus performs a data transmission subroutine, and after the completion of data transmission, returns to the step R. In contrast, when there are no data to be transmitted, the apparatus directly returns to the step R.

As will be described below, when an RCON frame destined for the apparatus has been received on the busy tone channel at an early stage of the connection establishment process, a data reception process has precedence over the data transmission process.

(Data Transmission Operations)

The operations for data transmission are explained hereafter with reference to FIG. 15. The operations up to step S05 in FIG. 15 are included in FIG. 8 for the first embodiment, so that they are not detailed again.

Responding to the detection of the presence of a gap on the busy tone channel at step S05, the MAC control unit 30 switches the Rx/Tx switch 40 in the modem 4 to the transmitter by sending a signal to the signal conductor 302, setting the modem 4 to the transmission mode. The signal is also used to initiate the transmitter 41. The MAC control unit 30 directs the data transmission unit 36 and the FIFO 32 to transmit a frame. The data transmission unit 36 generates a data stream including a preamble and a start delimiter at the head of an RCON header in the FIFO 32, and converts the data stream into a bit stream for the transmission path, and starts to transmit it to the modulator 42 of the modem 4 for the data channel. The data transmission unit 36 calculates CRC during the transmission of the bit stream. When the RCON header in the FIFO 32 has been transmitted, the data transmission unit 36 adds the calculated CRC and the end delimiter to the end of the RCON header, converts it into a bit stream for the transmission path, and transmits it to the modulator 42. The modulator 42 modulates a carrier wave for the transmitted bit stream and transmits the bit stream onto the data channel through the transmitter 41, duplexer 7, and antenna 8. Thus, the transmission of the RCON frame is started (step S06).

Having completed the transmission of the end delimiter of the RCON frame to the modulator 42, the data transmission unit 36 reports it to the MAC control unit 30. The MAC control unit 30 waits until the modem 4 completes the transmission of the RCON frame, then switches the Rx/Tx switch 40 to the receiver, by sending a signal to the signal conductor 302. As a result, the modem 4 for the data channel is set to the reception mode. This signal is also used to initiate the receiver 43. Then, the MAC control unit 30 informs the CPU 0 of the completion of the RCON frame transmission. The CPU 0 changes the connection state of the connection control table in the memory 1 to the CCON reception wait state (Step S07). Then, the CPU 0 initiates the CCON wait timer with 0 as the initial value (step S08).

When a signal on the data channel is received by the receiver 43 in the modem 4 and sent to the data reception unit 35 through the demodulator 44 in the form of a bit stream, the data reception unit 35 finds out the bit pattern of the start delimiter from the bit stream, and regards the bits following the start delimiter as a frame. Recognizing that the frame is destined for the apparatus, the data reception unit 35 reports it to the MAC control unit 30, and converts the received frame from the bit stream for the transmission path into a data stream until the end delimiter is detected, storing to the FIFO 31 for reception. The end delimiter is not stored to the FIFO 31. The data reception unit 35 examines the CRC of the frame. Prior to the frame storage to the FIFO 31, the MAC control unit 30 sends a control signal to the FIFO 31 to enable the writing of data from the data reception unit 35.

Then, it is determined whether the frame received by the CPU 0 is a CCON frame in step S09 along with the same operation shown in FIG. 8 for. the first embodiment. The operations from step S10 to step S23 are performed in the same manner as in the first embodiment.

If the CPU 0 has recognized the reception of an RCON frame destined for the apparatus (step S051) before a gap is detected in step S05 in the same manner as explained in the CCON frame reception in step S09, the radio communication apparatus of this embodiment performs the operations on and after the step S052, which are equal to their equivalents in FIG. 8 for the first embodiment.

If the value of the CCON wait timer has reached the predetermined maximum wait time for the connection establishment confirmation without the reception of a CCON frame on the data channel in the step 509 (step S091), the radio communication apparatus of this embodiment performs the operations on and after the step S092, which are equal to their equivalents in FIG. 8 for the first embodiment.

The operations from step S161 to step S164 are also equal to their equivalents in FIG. 8.

(Data Reception Operations)

The operations for data reception are explained hereafter with reference to FIG. 16.

Recognizing the reception of an RCON frame on the data channel (step R) in the same manner as explained in the CCON frame reception in step S09 in FIG. 15, the CPU 0 performs the operations on and after the step R01. The operations from step R01 to step R06 are equal to their equivalents in FIG. 9 for the first embodiment.

In the case where a gap has been detected on the busy tone channel in step R06, a CCON frame is generated from the CCON header in the FIFO 32 for transmission, and transmitted on the data channel (step R07).

Completing the transmission of the end delimiter of the CCON frame, the data transmission unit 36 reports it to the MAC control unit 30. The MAC control unit 30 waits until the modem 4 completes the transmission of the CCON frame, then switches the Rx/Tx switch 40 to the receiver by sending a signal to the signal conductor 302, setting the modem 4 to the reception mode. The signal is also used to initiate the receiver 43. Then, the MAC control unit 30 informs the CPU 0 of the completion of the CCON frame transmission. Receiving the information, the CPU 0 stops the gap wait timer (step R08).

Then, the operations from step R09 to step R23 are performed in the same manner as explained in FIG. 9 for the first embodiment.

The operations in the cases where the gap wait timer has reached its maximum without the detection of a gap on the busy tone channel in the step R061, where the connection hold timer has reached its maximum time without the reception of a DATA frame in the step R131, and where RSEQ and CSEQ do not agree to each other in the steps R151 and R152 are equal to the respective operations in the first embodiment.

Furthermore, the operations from the step R211 to step R213 are equal to their equivalents in the first embodiment.

(Effects)

As apparent from the explanation hereinbefore, the radio communication apparatus of this embodiment produces the same effects as those of the first embodiment. In other words, HTP can be solved because both the transmitting terminal and the receiving terminal transmit a busy tone on the busy tone channel when they are in data communication.

Furthermore, two terminals within a certain communication range can establish a connection and exchange data without a third terminal such as a base station, so that a distributed environment can be realized.

Furthermore, the entire network is prevented from becoming unable to communicate due to a failure of the base station.

Since the controlling procedure in data transmission is performed in the same manner as in the first embodiment, effective data transmission can be realized.

The radio communication apparatus of this embodiment has another effect which can not be obtained from the first embodiment. Since frames for connection establishment are transmitted by means of the data channel, the busy tone channel is used exclusively to transmit busy tones. Consequently, the band width of the busy tone channel can be smaller than in the first embodiment, contributing the effective use of the frequency band.

<Embodiment 3>

The third embodiment of the present invention will be described hereinafter in which the like components are labeled with like reference numerals with respect to the first and second embodiments, and the description of these components is not repeated. The busy tone channel and the data channel are assigned different frequency bands from each other just like in the first and second embodiments.

The present embodiment is different from the first embodiment in that the data channel is used for connection establishment, instead of the busy tone channel, and different from the second embodiment in that busy tones are transmitted while an RCON frame and a CCON frame are in process of transmission.

(The Overall Construction of the Radio Communication Apparatus)

The radio communication apparatus of this embodiment has the same fundamental construction as that of the first embodiment shown in FIG. 4. The MAC unit 3 of the present embodiment has the same construction as that of the second embodiment shown in FIG. 12. The frames of this embodiment are the same as those of the first embodiment shown in FIG. 3; however RCON frames and CCON frames to be transmitted on thE busy tone channel in the first embodiment are transmitted on the data channel.

(Operations of the Entire Radio Communication Apparatus)

The operations of the entire radio communication apparatus of the present embodiment are the same as those of the second embodiment shown in FIG. 14 except for the contents of the data transmission subroutine and the data reception subroutine.

(Data Transmission Operations)

The operations for data transmission of this embodiment differs from those of the second embodiment only in the RCON frame transmission operation.

Figure 17:
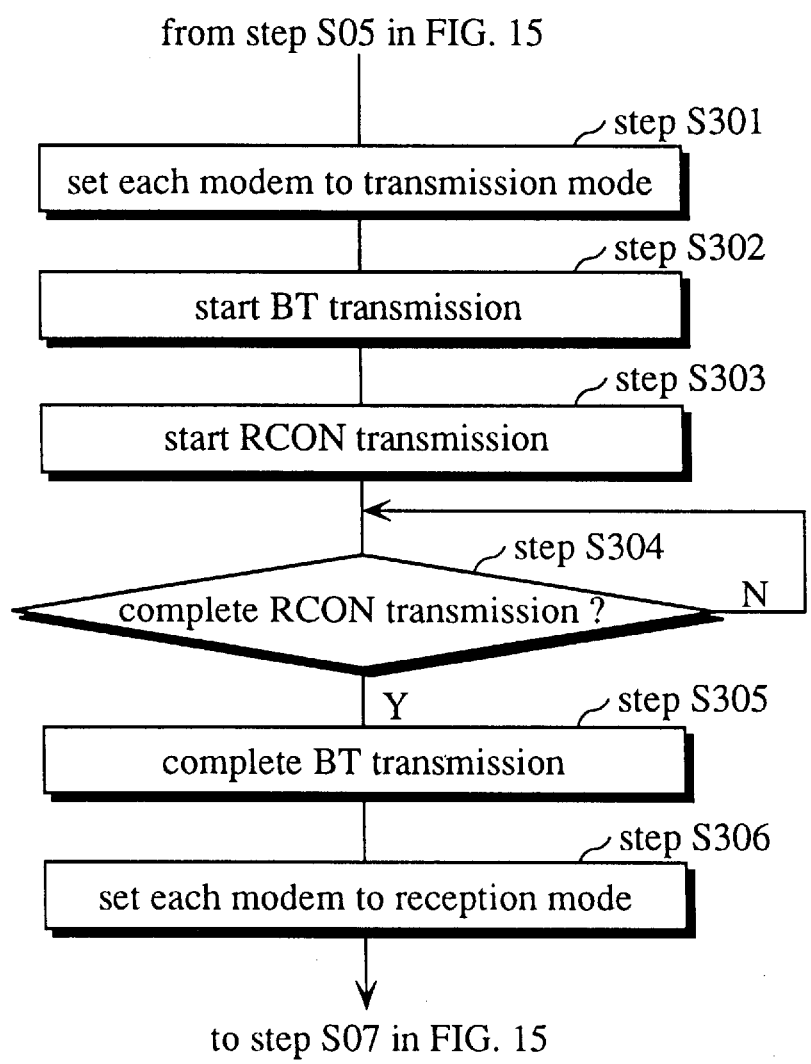
FIG. 17 is a flowchart depicting the RCON frame transmission operation of the radio communication apparatus of the third embodiment.

FIG. 17 is a flowchart depicting the RCON frame transmission operation of this embodiment, which corresponds to the step S06 of FIG. 15 which shows the RCON frame transmission operation of the second embodiment.

In FIG. 17, having detected a gap in the busy tone channel (step S05 in FIG. 15), the MAC control unit 30 switches the Rx/Tx switch 40 in the modem 4 and the Rx/Tx switch 50 in the modem 5 to the transmitter by sending signals to the signal conductors 302 and 303, setting the modems 4 and 5 to the transmission mode (step S301). These signals are also used to initiate the transmitters 41 and 51 respectively. Then, the MAC control unit 30 directs the busy tone transmission unit 34 to start busy tone transmission.

In response to the direction of the MAC control unit 30, the busy tone transmission unit 34 starts to transmit a bit stream including a predetermined iterative bit pattern for busy tones to the modulator 52 in the modem 5. The modulator 52 modulates a carrier wave for the transmitted bit stream in accordance with the frequency band and modulation scheme for the busy tone channel, and starts to transmit it on the busy tone channel through the transmitter 51, the duplexer 7, and the antenna 8 (step S302).

Then, the MAC control unit 30 directs the data transmission unit 36 and the FIFO 32 to transmit a frame. The data transmission unit 36 generates a data stream including a preamble and a start delimiter at the head of an RCON header in the FIFO 32, converts the data stream into a bit stream for the transmission path, and starts to transmit it to the modulator 42 of the modem 4 for the busy tone channel. The modulator 42 modulates a carrier wave for the transmitted bit; stream and transmits the bit stream on the data channel through the transmitter 41, duplexer 7, and antenna 8 (step S303).

The data transmission unit 36 calculates CRC during the transmission of the bit stream to the modulator 42. After the transmission of the RCON header stored in FIFO 32, the data transmission unit 36 adds the calculated CRC and end delimiter to the end of the RCON header, and sends it to the modulator 42 in the form of a bit stream for the transmission path.

Having completing the transmission of the end delimiter of the RCON frame to the modulator 42 (step S304), the data transmission unit 36 reports it to the MAC control unit 30. The MAC control unit 30 waits until the modem 5 completes the transmission of the RCON frame, then directs the busy tone transmission unit 34 to stop the busy tone transmission (step S305).

The MAC control unit 30 then switches the Rx/Tx switches 40 and 50 to the receiver by sending signals to the signal conductors 302 and 303, setting the modems 4 and 5 to the reception mode (step S306). These signals are also used to initiate the receivers 43 and 53 respectively. Then, the MAC control unit 30 informs the CPU 0 of the completion of the RCON frame transmission. The subsequent operations are equal to the operations on and after the step S07 in FIG. 15.

(Data Reception Operations)

The operations for data reception of this embodiment are explained hereafter. The operations differs from those of the second embodiment only in operations from a CCON frame transmission through a busy tone transmission which correspond to step R07 through step R10 in FIG. 16.

FIG. 18 is a flowchart depicting a CCON frame transmission and a busy tone transmission of this embodiment, which corresponds to the steps R07 through R10 of FIG. 16 for the second embodiment.

In FIG. 18, having detected a gap on the busy tone channel (step R06 in FIG. .16), the MAC control unit 30 switches the Rx/Tx switch 40 in the modem 4 and the Rx/Tx switch 50 in the modem 5 to the transmitter by sending signals to the signal conductors 302 and 303, setting the modems 4 and 5 to the transmission mode (step R301). These signals are also used to initiate the transmitters 41 and 51 respectively.

Then, the MAC control unit 30 directs the busy tone transmission unit 34 to start busy tone transmission. In response to the direction of the MAC control unit 30, the busy tone transmission unit 34 starts to transmit a bit stream including a predetermined iterative bit pattern for busy tones to the modulator 52 in the modem 5. The modulator 52 modulates a carrier wave for the transmitted bit stream in accordance with the frequency band and modulation scheme for the busy tone channel, and starts to transmit it on the busy tone channel through the transmitter 51, the duplexer 7, and the antenna 8 (step R302).

Then, the MAC control unit 30 directs the data transmission unit 36 and the FIFO 32 to transmit a frame. The data transmission unit 36 generates a data stream including a preamble and a start delimiter at the head of an RCON header in the FIFO 32, converts the data stream into a bit stream for the transmission path, and starts to transmit it to the modulator 42 of the modem 4 for the busy tone channel. The modulator 42 modulates a carrier wave for the transmitted bit stream and transmits the bit stream on the data channel through the transmitter 41, duplexer 7, and antenna 8 (step R303).

The data transmission unit 36 calculates CRC during the transmission of the bit stream to the modulator 42. After the transmission of the CCON header stored in FIFO 32, the data transmission unit 36 adds the calculated CRC and end delimiter to the end of the CCON header, and sends it to the modulator 42 in the form of a bit stream for the transmission path.

Having completed the transmission of the end delimiter of the CCON frame to the modulator 42 (step R304), the data transmission unit 36 reports it to the MAC control unit 30. The MAC control unit 30 waits until the transmission of the RCON frame is completed, switches the Rx/Tx switch 40 to the receiver by sending a signal to the signal conductor 302, setting the modem 4 to the reception mode (step R305). The signal is also used to initiate the receiver 43. Then, the MAC control unit 30 informs the CPU 0 of the completion of the CCON frame transmission. Being informed of the completion, the CPU 0 stops the gap wait timer (step R306). The subsequent operations are equal to the operations on and after the step R11 in FIG. 16.

(Effects)

As apparent from the explanation hereinbefore, the radio communication apparatus of this embodiment produces the same effects as those of the first and second embodiments. In other words, HTP can be solved because both a transmitting terminal and a receiving terminal transmit a busy tone on the busy tone channel when they are in data communication.

Furthermore, two terminals within a certain communication range can establish a connection and exchange data without a third terminal such as a base station, so that a distributed environment can be realized.

Since the controlling procedure in data transmission is performed in the same manner as in the first embodiment, effective data transmission can be realized.

The busy tone channel is used exclusively to transmit busy tones which indicate that data are in process of transmission, so that the band width of the busy tone channel can be smaller than in the first embodiment, contributing the effective use of the frequency band.

The radio communication apparatus of this embodiment has another effect which can not be obtained from the first and second embodiments as follows.

According to the first and second embodiments, a busy tone is not transmitted while an RCON (CCON) frame is in process of transmission. As a result, when two terminals are in data communication, a third terminal may start a transmission, to disturb their data communication. This can be avoided if an RCON (CCON) frame is transmitted only in a case where a gap on the data channel has been detected in the same manner as a gap is detected on a busy tone channel, prior to the transmission. However, these two different gap detections make the process complicated and the circuit enlarged.

In contrast, according to the present embodiment, a busy tone is transmitted prior to the transmission of an RCON (CCON) frame, a collision of RCON (CCON) frames can be avoided only by checking the busy tone channel. Thus, two terminals can establish a connection in a shorter time because they are less affected by other terminals.

(Supplement)

(1) Although the busy tone channel and the data channel are assigned different frequency bands from each other in the first, second, and third embodiments, it is possible to use physically the same frequency band by means of time sharing or code division.

For example, the same frequency band is logically used for two channels by means of time sharing, each duplexer is operated as an antenna switch. The duplexers at all the terminals in a radio network switch between the busy tone channel and the data channel at every breakpoint of time sharing, thereby realizing two logical channels.

In the case where the same frequency band is logically used for two channels by means of code division, the modems for the busy tone channel and the data channel, which correspond to spread spectrum modulation/demodulation use a carrier having the same frequency. The logical two channels are realized by differentiating the spreading codes.

Thus, time sharing or code division can contribute to the effective use of the frequency band.

(2) Although the gap times are predetermined in the first, second, and third embodiment, they can be randomized.

(3) If a terminal which is ready to transmit an RCON frame has received an RCON frame destined for the terminal itself while it is observing the busy tone channel, the terminal is supposed to clear the connection control table and to receive data in the first, second, and third embodiments. However, the data transmission operation can be continued, ignoring the received RCON frame.

In addition, when a signal having more strength than predetermined has been detected while the busy tone channel is being observed, before an RCON (or CCON) frame is transmitted, the busy tone observation may be interrupted for either a predetermined or randomized time period. This can reduce the power consumption.

(4) A terminal which has received a DATA frame whose EOP bit is 1 completes the transmission of a busy tone after it waits until the maximum connection holding time is over, with the use of the connection holding timer, thereby releasing the connection in the first, second, and third embodiments. However, the wait time is not necessarily limited to the maximum connection holding time. The subsequent process may be started after a wait time which is either shorter or longer than the maximum connection holding time, by using another timer. After a longer wait time, data retransmission in an upper layer level which is caused by the dropping of a ACK frame for the last DATA frame can be prevented. After a shorter wait time, a connection can be released faster, and as a result, another terminal can start data transmission earlier.

(5) Although a receiving terminal returns an ACK frame every time it receives a DATA frame in the first, second, and third embodiments, it is not the only way. A transmitting terminal may carry information to request acknowledgement in every predetermined number of DATA frames, and returns an ACK frame for the acknowledgement of all the DATA frames that have not been acknowledged so far only in the case where the receiving terminal has received a DATA frame including the information to request acknowledgement. However, if it is necessary to retransmit the DATA frame in this case, all the DATA frames which have not been acknowledged by an ACK frame must be retransmitted. For another method, it is possible that no ACK frames are transmitted at all. In this case, retransmitting operations are up to an upper layer level.

(6) Both a transmitting terminal and a receiving terminal continue to transmit a busy tone when a connection is being established in the first, second, and third embodiments; however, the busy tone may be transmitted intermittently. In that case, it is necessary that the intermitting time period is below a predetermined gap time. This can reduce the power consumption.

(7) Although a receiving terminal transmits a busy tone after the completion of a CCON frame transmission in the second embodiment, a busy tone may be transmitted at the same time as the start of the CCON frame transmission. This makes the second embodiment realize a function of avoiding a collision of CCON frames in the same manner as the third embodiment.

(8) In the third embodiment, a transmitting terminal continuously transmits a busy tone while it is transmitting an RCON frame; however, the transmission of the busy tone may be stopped when a certain time has passed after the start of the RCON frame transmission. This can reduce the power consumption.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A radio communication method for transmitting and receiving data between a first terminal and a second terminal using a control channel and a data channel, said method comprising the steps of:
   a connection establishment phase which includes:
      a first check step in which the first terminal checks whether a busy tone, a first control signal, and a second control signal are all absent on the control channel, wherein the first control signal conveys a connection request and the second control signal conveys an acknowledgment of the connection request;
      a connection request step in which the first terminal transmits the first control signal to the second terminal via the control channel when the first terminal confirms that the busy tone, the first control signal, and the second control signal are all absent on the control channel;
      a second check step in which the second terminal, on receiving the first control signal from the first terminal, checks whether the busy tone, the first control signal, and the second control signal are all absent on the control channel;
      a connection acknowledgment step in which the second terminal transmits the second control signal to the first terminal via the control channel when the second terminal confirms that the busy tone, the first control signal, and the second control signal are all absent on the control channel, then starts continuously transmitting the busy tone to the control channel; and
      a busy tone transmission step in which the first terminal, on receiving the second control signal from the second terminal, starts continuously transmitting the busy tone to the control channel; and
   a data communication phase which includes:
      a data communication step in which a data communication between the first terminal and the second terminal via the data channel starts; and
      a data communication end step in which the data communication between the first terminal and the second terminal ends and the first terminal and the second terminal stop transmitting the busy tone.

2. A radio communication method for transmitting and receiving data between a first terminal and a second terminal using a control channel and a data channel, said method comprising the steps of:
   a connection establishment phase which includes:
      a first check step in which the first terminal checks whether a busy tone is absent on the control channel;
      a connection request step in which the first terminal transmits a first control signal to the second terminal via the data channel when the first terminal confirms that the busy tone is absent on the control channel, wherein the first control signal conveys a connection request;
      a second check step in which the second terminal, on receiving the first control signal from the first terminal, checks whether the busy tone is absent on the control channel;
      a connection acknowledgment step in which the second terminal transmits a second control signal to the first terminal via the data channel when the second terminal confirms that the busy tone is absent on the control channel, wherein the second control signal conveys an acknowledgment of the connection request, then starts continuously transmitting the busy tone to the control channel; and
      a busy tone transmission step in which the first terminal, on receiving the second control signal from the second terminal, starts continuously transmitting the busy tone to the control channel; and
   a data communication phase which includes:
      a data communication step in which a data communication between the first terminal and the second terminal via the data channel starts; and
      a data communication end step in which the data communication between the first terminal and the second terminal ends and the first terminal and the second terminal stop transmitting the busy tone.

3. A radio communication apparatus for transmitting and receiving data to and from a desired radio communication apparatus using a control channel and a data channel, said radio communication apparatus comprising:
   a connection establishment means which includes:
      a connection request unit for checking whether a busy tone, a first control signal conveying a connection request, and a second control signal conveying an acknowledgment of the connection request are all absent on the control channel, then on confirming an absence of the signals, transmitting the first control signal to the desired radio communication apparatus via the control channel;
      a connection acknowledgment unit which, on receiving a first control signal from the desired radio communication apparatus, checks whether the busy tone, the first control signal, and the second control signal are all absent on the control channel, then on confirming an absence of the signals, transmits the second control signal to the desired radio communication apparatus via the control channel, and starts continuously transmitting the busy tone to the control channel;

a busy tone transmission unit which, on receiving a second control signal from the desired radio communication apparatus, starts continuously transmitting the busy tone to the control channel; and a data communication means which includes:

a data communication unit for performing a data communication using the data channel after either of the connection acknowledgment unit and the busy tone transmission unit starts transmitting the busy tone;

a data communication end unit for ending the data communication and stopping transmitting the busy tone.

4. A radio communication apparatus for transmitting and receiving data to and from a desired radio communication apparatus using a control channel and a data channel, said radio communication apparatus comprising:

a connection establishment means which includes:

a connection request unit for checking whether a busy tone is absent on the control channel, then on confirming an absence of the busy tone, transmitting a first control signal conveying a connection request to the desired radio communication apparatus via the data channel;

a connection acknowledgment unit which, on receiving a first control signal from the desired radio communication apparatus, checks whether the busy tone is absent on the control channel, then on confirming an absence of the busy tone, transmits a second control signal conveying an acknowledgment of the connection request to the desired radio communication apparatus via the data channel, and starts continuously transmitting the busy tone to the control channel;

a busy tone transmission unit which, on receiving a second control signal from the desired radio communication apparatus, starts continuously transmitting the busy tone to the control channel; and a data communication means which includes:

a data communication unit for performing a data communication using the data channel after either of the connection acknowledgment unit and the busy tone transmission unit starts transmitting the busy tone; and a data communication end unit for ending the data communication and stopping transmitting the busy tone.

* * * * *